US010461317B2

(12) United States Patent
Thielen et al.

(10) Patent No.: US 10,461,317 B2
(45) Date of Patent: Oct. 29, 2019

(54) SOLID ELECTRODE INCLUDING ELECTROLYTE-IMPREGNATED ACTIVE MATERIAL PARTICLES

(71) Applicant: Robert Bosch GmbH, Stuttgart (DE)

(72) Inventors: Joerg Thielen, Stuttgart (DE); Ulrich Sauter, Karlsruhe (DE); Frank Baumann, Hayward, CA (US)

(73) Assignee: Robert Bosch GmbH, Stuttgart (DE)

( * ) Notice: Subject to any disclaimer, the term of this patent is extended or adjusted under 35 U.S.C. 154(b) by 155 days.

(21) Appl. No.: 15/366,942

(22) Filed: Dec. 1, 2016

(65) Prior Publication Data

US 2017/0162862 A1 Jun. 8, 2017

(30) Foreign Application Priority Data

Dec. 4, 2015 (DE) .................. 10 2015 224 335

(51) Int. Cl.
| | | |
|---|---|---|
| *H01M 4/137* | (2010.01) | |
| *H01M 4/134* | (2010.01) | |
| *H01M 4/1395* | (2010.01) | |
| *H01M 4/1397* | (2010.01) | |
| *H01M 4/1399* | (2010.01) | |

(Continued)

(52) U.S. Cl.
CPC ......... *H01M 4/137* (2013.01); *H01M 4/0404* (2013.01); *H01M 4/0416* (2013.01); *H01M 4/134* (2013.01); *H01M 4/136* (2013.01); *H01M 4/1395* (2013.01); *H01M 4/1397* (2013.01); *H01M 4/1399* (2013.01); *H01M 4/364* (2013.01); *H01M 4/382* (2013.01); *H01M 4/587* (2013.01); *H01M 4/604* (2013.01); *H01M 4/625* (2013.01); *H01M 10/0525* (2013.01); *H01M 10/0562* (2013.01); *H01M 10/0566* (2013.01); *H01M 2004/027* (2013.01); *H01M 2004/028* (2013.01); *H01M 2220/20* (2013.01); *H01M 2300/0025* (2013.01); *H01M 2300/0068* (2013.01); *H01M 2300/0094* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,372,388 B1 * | 4/2002 | Katsurao | ............. | C08F 214/225 429/217 |
| 2002/0015885 A1 * | 2/2002 | Hara | ............. | H01M 4/13 429/212 |

(Continued)

FOREIGN PATENT DOCUMENTS

| | | |
|---|---|---|
| DE | 102012209313 A1 | 12/2013 |
| WO | 2013/182360 A1 | 12/2013 |

*Primary Examiner* — Christopher P Domone
(74) *Attorney, Agent, or Firm* — Norton Rose Fulbright US LLP; Gerard Messina

(57) ABSTRACT

A method for manufacturing a solid electrode. To more strongly utilize the intrinsic properties of a porous active material with respect to capacitance and therefore energy density and also rate and high-current capability, in the method, porous active material particles are impregnated using an ion-conducting liquid which contains monomers and/or oligomers in particular and a solid electrode is formed from the impregnated active material particles by adding at least one solid electrolyte. In addition, the invention relates to such solid electrodes and all-solid-state cells.

26 Claims, 2 Drawing Sheets

(51) Int. Cl.
    *H01M 4/04*       (2006.01)
    *H01M 4/36*       (2006.01)
    *H01M 4/38*       (2006.01)
    *H01M 4/587*      (2010.01)
    *H01M 4/60*       (2006.01)
    *H01M 4/62*       (2006.01)
    *H01M 10/0525*    (2010.01)
    *H01M 10/0562*    (2010.01)
    *H01M 10/0566*    (2010.01)
    *H01M 4/136*      (2010.01)
    *H01M 4/02*       (2006.01)

(56) References Cited

U.S. PATENT DOCUMENTS

| 2004/0072067 A1* | 4/2004 | Minami | H01M 4/0404 |
| | | | 429/212 |
| 2014/0234702 A1* | 8/2014 | Zhang | H01M 4/583 |
| | | | 429/199 |
| 2016/0118685 A1* | 4/2016 | Zhang | H01M 4/043 |
| | | | 429/305 |

* cited by examiner

SOLID ELECTRODE INCLUDING ELECTROLYTE-IMPREGNATED ACTIVE MATERIAL PARTICLES

RELATED APPLICATION INFORMATION

The present application claims priority to and the benefit of German patent application no. 10 2015 224 335.4, which was filed in Germany on Dec. 4, 2015, the disclosure of which is incorporated herein by reference.

FIELD OF THE INVENTION

The present invention relates to a method for manufacturing a solid electrode, solid electrodes, and all-solid-state cells.

BACKGROUND INFORMATION

Presently, liquid electrolytes are mostly used in battery cells, in particular lithium battery cells.

All-solid-state cells are special battery cells, in which solid and/or gel-type electrolytes are used.

SUMMARY OF THE INVENTION

The object of the present invention is a method for manufacturing a solid electrode. In particular, the method may also be configured to manufacture an all-solid-state cell.

In the method, (initially), for example, in a method step a), porous active material particles are impregnated using an ion-conducting, in particular lithium-ion-conducting liquid. In particular, the open pores of the porous active material particles may be infiltrated and/or essentially completely filled up using the ion-conducting, in particular lithium-ion-conducting liquid. (Finally), for example, in a method step b), a solid electrode may be formed from the impregnated active material particles by adding at least one solid electrolyte.

A solid electrode may be understood in particular as an electrode which includes at least one solid electrolyte and/or is solid per se. For example, a solid electrode may include as the electrolyte(s), in particular primarily, for example, ≥50 vol. %, for example, ≥75 vol. %, solid electrolyte in relation to the total volume of the electrolyte of the electrode.

A solid electrolyte may be understood in particular as a solid or gel-type electrolyte. For example, a solid electrolyte may be, for example, a solid or gel-type polymer electrolyte, for example, a single-ion-conducting polyelectrolyte and/or a polymer gel electrolyte, and/or a, for example, solid, in particular inorganic, e.g. ceramic and/or glass-like ion conductor.

A polymer electrolyte may be understood in particular as a solid electrolyte which is based on at least one polymer. For example, a polymer electrolyte may be based on at least one, in particular solid polymer, for example, polyethylene oxide (PEO), in which at least one conducting salt is dissolved, or on a single-ion-conducting polyelectrolyte (SIC; single ion conductor).

A single-ion-conducting polyelectrolyte may be understood in particular as a polymer, which is solid in particular, and in which only the electrochemically active species, in particular cationic ions (cations), for example, alkali ions, for example—as in the case of a lithium cell—lithium ions ($Li^+$), is/are mobile and/or in which their counter ion(s), in particular anionic ions (anions), is/are immobile, in particular covalently bound.

A polymer electrolyte may optionally furthermore include one or several liquid components, such as solvents and/or gel formers (plasticizers), for example, at least one organic carbonate, for example, ethylene carbonate (EC) and/or propylene carbonate (PC), and/or at least one low-molecular polyether, for example, polyethylene glycol (PEG400), and/or at least one ionic liquid. Such polymer electrolytes, for example, based on at least one, in particular solid polymer, for example, polyethylene oxide (PEO) and/or polyacrylonitrile (PAN) and/or polyvinylidene fluoride (PVDF), and at least one gel-forming liquid, for example, at least one gel-forming solvent, for example, at least one organic carbonate, for example, ethylene carbonate and/or propylene carbonate, and/or at least one low-molecular polyether, for example, polyethylene glycol (PEG400), and/or at least one ionic liquid, may also be in gel form, for example, and in particular may also be referred to as a polymer gel electrolyte.

An oligomer electrolyte may be understood in particular as an electrolyte which is based on at least one oligomer.

An oligomer may be understood in particular as a chemical compound which is formed from 2 to 100, for example, 4 to 100, for example, up to 30 structurally identical or similar units and has a molar mass of less than or equal to 10,000 g/mol.

For example, an oligomer electrolyte may be based on at least one, for example, viscous oligomer, for example, polyethylene glycol, for example, having a molar mass of 400 g/mol (PEG400), in which at least one conducting salt is dissolved, or may be based on a single-ion-conducting oligoelectrolyte.

A single-ion-conducting oligoelectrolyte (SIC; single ion conductor) may be understood in particular as a, for example, viscous oligomer, in which only the electrochemically active species, in particular cationic ions (cations), for example, alkali ions, for example—as in the case of a lithium cell—lithium ions ($Li^+$), is/are mobile and/or in which their counter ion(s), in particular anionic ions (anions), is/are immobile, in particular covalently bound.

An ion-conducting, for example, lithium-ion-conducting material, for example, an ion-conducting, for example, lithium-ion-conducting liquid, may be understood in particular as a material which includes ions to be conducted, which are mobile in particular, for example, lithium ions. For example, the ion-conducting material, for example, the ion-conducting liquid, may include the ions in the form of a conducting salt, for example, a lithium conducting salt, in particular having mobile, cationic ions, for example, lithium ions, and mobile, anionic counter ions, for example, lithium conducting salt anions, and/or in the form of a single-ion-conducting polyelectrolyte and/or oligoelectrolyte, in particular having mobile, cationic ions, for example, lithium ions, and immobile, in particular covalently bound anionic counter ions.

An ion-conductive, for example, lithium-ion-conductive material, for example, an ion-conductive, for example, lithium-ion-conductive solvent or polymer may be understood in particular as a material which may itself be free of the ions to be conducted, for example, lithium ions, but is configured to coordinate counter ions of the ions to be conducted, for example, lithium conducting salt anions, or to coordinate and/or solvate the ions to be conducted themselves, for example, lithium ions, and, for example, becomes ion-conductive, for example, lithium-ion-conductive upon addition of the ions to be conducted, for example, lithium ions, in particular in the form of a conducting salt, for example, a lithium conducting salt, and/or a single-ion-conducting polyelectrolyte and/or oligoelectrolyte.

An all-solid-state cell may be understood in particular as an electrochemical cell which includes at least one solid electrode and/or at least one solid electrolyte. In particular, an all-solid-state cell may be formed from components, for example, a cathode, an anode, and one or several separator and/or protective layers, and also current collector(s), which are solid per se. For example, an all-solid-state cell may include a solid electrode, for example, a solid cathode, and a further solid electrode, for example, a metallic anode, or two solid electrodes, for example, a solid cathode and a solid anode, and one or several solid separator and/or protective layers, for example, based on a solid electrolyte, and solid current collectors, for example, a metallic cathode current collector and/or a metallic anode current collector, or may be formed therefrom.

Ion-conducting liquids may advantageously penetrate into finer and/or lower-lying pores of porous active material particles and may fill them up significantly more, possibly even completely, than solid electrolytes. The filling degree may thus advantageously be increased by the ion-conducting liquid and in particular the ionic contact of the entire porous active material, namely in particular also the inner surface thereof, may be significantly improved. On the one hand, the participation of the active material in the electrochemical process of the electrochemical cell reaction and in this way the utilization of the capacity of the active material in the electrode and, linked thereto, the usable specific energy density may thus be significantly improved. On the other hand, transition resistances may thus be reduced, since in the case of otherwise electrolyte-free pores, the ion transport has to take place via the active material, which typically has a significantly lower intrinsic ionic conductivity. This in turn advantageously enables the rate and/or high-current capability of the cell to be comparatively improved. By adding the at least one solid electrolyte during the formation of the solid electrode, the particles may advantageously additionally be ionically contacted from the outside and the mechanical stability of the electrode may be improved.

Overall, a solid electrode based on a porous active material may thus advantageously be provided, having improved intrinsic properties with respect to capacitance and therefore energy density and also rate and/or high-current capability.

The method according to the present invention has proven to be particularly advantageous in particular in the case of highly porous materials, such as sulfur-based active materials, for example, SPAN, which will be explained hereafter.

Within the scope of one specific embodiment, a monomer and/or oligomer-containing ion-conducting, in particular lithium-ion-conducting liquid is used as the ion-conducting, in particular lithium-ion-conducting liquid. In particular, the open pores of the porous active material particles may be infiltrated and/or essentially completely filled up with the monomer and/or oligomer-containing ion-conducting liquid. The monomer and/or oligomer-containing ion-conducting liquid may in particular contain monomers and/or oligomers for forming a polymer electrolyte and/or oligomer electrolyte. For example, the monomers and/or oligomers may be configured to form a polymer electrolyte and/or oligomer electrolyte with the aid of polymerization and/or oligomerization and/or cross-linking.

Monomers and oligomers may advantageously—in particular as a result of the small size and/or low molecular weight thereof—penetrate into significantly smaller pores than polymers, which have a significantly greater size (coil size) and a significantly higher molecular weight. The monomer and/or oligomer-containing ion-conducting liquid and therefore the polymer electrolyte and/or oligomer electrolyte formed therefrom may advantageously penetrate significantly deeper into the open pores of the porous active material particles and fill them significantly higher, possibly even completely, than a conventional polymer electrolyte which is only externally applied, and which is applied, for example, by a conventional paste process using a solvent-based paste, the solvent of which is later removed again and again provides free pore volume and/or which has a coil size exceeding the pore size and/or which is even applied by a dry mixing process, in which polymer electrolyte may penetrate only to some extent into fine open pores of the active material due to its high viscosity, if at all. Because the polymer electrolyte and/or oligomer electrolyte formed from the monomers and/or oligomers may also be formed in fine and/or low-lying pores of the porous active material and may possibly even fill them completely, the filling degree may advantageously be increased and in particular the ionic contact of the entire surface, namely the inner and outer surface, of the active material may be significantly improved. Thus—as already explained—the intrinsic properties of the porous active material with respect to capacitance and therefore energy density and also rate and/or high-current capability may be improved and in particular may be utilized significantly more strongly than is possible by solely using a solid electrolyte, such as a polymer electrolyte, which embeds porous active material particles.

Within the scope of another specific embodiment, the monomers and/or oligomers are configured to form a polymer electrolyte and/or oligomer electrolyte, to form a single-ion-conducting polyelectrolyte and/or oligoelectrolyte, and/or to form an ion-conductive, in particular lithium-ion-conductive, for example, solid polymer and/or an ion-conductive, in particular lithium-ion-conductive, for example, viscous oligomer.

Insofar as the in particular monomer and/or oligomer-containing, ion-conductive liquid contains monomers and/or oligomers which are configured to form an ion-conductive, in particular lithium-ion-conductive polymer and/or oligomer, the ion-conducting, for example, lithium-ion-conducting liquid and/or optionally the further liquid explained hereafter contains in particular at least one conducting salt, for example, lithium conducting salt, for example, lithium bis(trifluormethane sulfonyl)imide (LiTFSI), and/or monomers and/or oligomers to form a single-ion-conducting polyelectrolyte and/or oligoelectrolyte. The ion-conductive polymer and/or oligomer formed from the monomers and/or oligomers may thus become ion-conductive and in this way a polymer electrolyte and/or oligomer electrolyte may be formed. Because the ion-conductive liquid includes at least one conducting salt, a particularly high and consistent conducting salt concentration may advantageously be achieved over all pores of the porous active material particles.

Insofar as the monomer and/or oligomer-containing, ion-conducting liquid contains monomers and/or oligomers which are configured to form a single-ion-conducting polyelectrolyte and/or oligoelectrolyte, is based on one, in particular solid polymer or at least one, in particular viscous oligomer, in which conducting salt anions are immobile, in particular covalently bound, the ion-conducting, for example, lithium-ion-conducting liquid contains at least the corresponding conducting salt cations, for example lithium ions, as counter ions.

Within the scope of one special embodiment, the monomers and/or oligomers for forming a polymer electrolyte and/or oligomer electrolyte are configured to form a single-ion-conducting polyelectrolyte and/or oligoelectrolyte. Single-ion-conducting polyelectrolytes and/or oligoelectrolytes may advantageously—in particular because of the covalent bonding of the counter anion—have lithium cation transference numbers close to 1. This advantageously enables, in particular with high current densities applied over long periods of time, the formation of concentration gradients to be significantly reduced, which otherwise result in high overvoltages and could limit the achievable current densities themselves, in relation to conventional polymer electrolytes based on an ion-conductive, in particular lithium-ion-conductive polymer having lithium salt dissolved therein, which typically only has a transference number significantly <0.5, usually around 0.25.

Within the scope of another, alternative or additional specific embodiment, a liquid electrolyte is used as the ion-conducting, in particular lithium-ion-conducting liquid. For example, the liquid electrolyte may include at least one ion-conducting, in particular lithium-ion-conducting solvent, for example, at least one organic carbonate, and at least one conducting salt, for example, lithium conducting salt. Liquid electrolytes may advantageously also penetrate into fine and low-lying pores and may fill them significantly higher, possibly even completely, than solid electrolytes and in this way may increase the filling degree and in particular significantly improve the ionic contacting of the entire surface, namely the inner and outer surface, of the active material. Thus—as already explained—the intrinsic properties of the porous active material with respect to capacitance and therefore energy density and also rate and/or high-current capability may be improved and in particular utilized significantly more strongly than is possible by solely using a solid electrolyte, such as a polymer electrolyte, which embeds porous active material particles.

In principle, it is thus possible that the pores of the porous active material particles become or are impregnated using a liquid or viscous liquid, for example, viscous oligomers and/or liquid electrolyte, and the electrode overall solely represents a solid electrode as a result of the at least one solid electrolyte which is added. The manufacturing method may thus advantageously be made particularly simple. In particular if the oligomers have a sufficiently high viscosity, the polymerization and/or cross-linking explained hereafter may be omitted and the method may be kept significantly simpler in this way. For example, if a low viscosity of the oligomers is required for complete penetration of the pores of the porous active material, however, and the oligomers should not or cannot be caused to completely penetrate the pores in another way, for example, if the ion-conducting liquid is to be made solvent-free and/or the oligomers have a low solubility in solvents, for example, oligomers having a low molar mass and/or monomers may be used, for example, which may be polymerized and/or cross-linked as explained hereafter.

Within the scope of another specific embodiment, the monomers and/or oligomers, in particular while forming a polymer electrolyte and/or oligomer electrolyte, are therefore (then), for example, after the impregnation of the porous active material particles with the ion-conducting liquid or in a method step a'), polymerized and/or cross-linked.

Because the monomers and/or oligomers are, for example, polymerized and/or cross-linked after the impregnation of the porous active material particles using the ion-conducting liquid inside the pores, on the one hand, an in particular solid or at least gel-type polymer electrolyte and/or and in particular solid, gel-type, or at least (high) viscosity oligomer electrolyte may advantageously be formed, which also penetrates the pores in the interior of the porous particles. Thus—in contrast to conventional, externally applied solid electrolytes, for example, polymer electrolytes, which may only penetrate partially into the outermost pores—ion-conducting paths may advantageously be formed, which penetrate the interior of the porous active material particles. The ion conductivity inside the porous active material particles may thus in turn advantageously be significantly increased. On the other hand, the polymer electrolyte and/or oligomer electrolyte formed from the monomers and/or oligomers may thus advantageously also penetrate the interior of the porous active material particles mechanically, for example, like a network. Thus, the polymer electrolyte and/or oligomer electrolyte formed from the monomers and/or oligomers may thus advantageously be prevented from being dissolved away from the pores of the porous active material particles again by solvents during subsequent processes. Since the polymer electrolyte and/or oligomer electrolyte formed from the monomers and/or oligomers advantageously may extend from the opening surfaces of the outermost pores of the porous active material particles down to pores located deep inside and through the porous active material particles, the quantity of solid electrolyte added during the formation of the solid electrode may advantageously be reduced and/or, for example, a dry coating process may also be used to form the electrode.

The cross-linking of the monomers and/or oligomers may be carried out, for example, with the aid of integrated and/or terminal cross-linking units in monomer or oligomer groups.

Within the scope of another specific embodiment, the monomers and/or oligomers and/or the polymer electrolyte and/or oligomer electrolyte formed therefrom, in particular by polymerization and/or cross-linking, are linked chemically, in particular covalently, to functional groups on the surface of the porous active material particles. For example, the monomers and/or oligomers and/or the polymer electrolyte and/or oligomer electrolyte formed therefrom may be grafted or polymerized onto functional groups on the surface of the porous active material particles. The chemical, in particular covalent bonding to the active material may advantageously prevent the polymer electrolyte and/or oligomer electrolyte from being able to be dissolved away from the pores of the porous active material particles again by solvents during subsequent processes. In the case of active material particles formed from the sulfur-polymer composites explained hereafter, for example, sulfur-polyacrylonitrile composites, grafting or polymerization may optionally be carried out directly on functional groups on the surface of the porous active material particles and, for example, an additional process step for prior introduction of a corresponding functionalization may be omitted.

Within the scope of another specific embodiment, the, in particular monomer and/or oligomer-containing, ion-conducting liquid furthermore contains a polymerization initiator and/or a cross-linking initiator and/or a linking initiator, for example, a radical starter, such as azobis(isobutyronitrile) (AIBN). The polymerization and/or cross-linking and/or linking reaction may thus advantageously be started intentionally.

Within the scope of another, additional or alternative specific embodiment, the polymerization and/or cross-linking and/or linking reaction is started by heating or thermally and/or by irradiation or in a radiation-induced, in particular UV-induced way. The polymerization and/or cross-linking and/or linking reaction may thus advantageously be intentionally started in a simple way. By heating or thermal induction, a polymerization and/or cross-linking and/or linking reaction may advantageously also be started in internal open pores. By irradiation or radiation induction, a polymerization and/or cross-linking and/or linking reaction may be started in external open pores, and in this way at least an advantageous encapsulation may be achieved.

If liquid monomers and/or oligomers are used, the in particular monomer and/or oligomer-containing ion-conducting liquid may be solvent-free in particular. Thus, the filling degree of the pores of the porous active material with the polymer electrolyte and/or oligomer electrolyte to be formed may advantageously be maximized.

However, it is also possible that the in particular monomer and/or oligomer-containing ion-conducting liquid (furthermore) contains at least one solvent. For example, the monomers and/or oligomers may be dissolved in the at least one solvent of the ion-conducting liquid.

If the in particular monomer and/or oligomer containing ion-conducting liquid contains monomers and/or oligomers which are configured to form a polymer electrolyte and/or oligomer electrolyte, which is based on at least one, in particular solid polymer or at least one, in particular viscous oligomer, in which at least one conducting salt is dissolved, in particular also the at least one conducting salt, for example, lithium conducting salt, for example, lithium bis(trifluormethane sulfonyl)imide (LiTFSI), may also be dissolved in the at least one solvent of the ion-conducting liquid.

For example, the ion-conducting liquid may contain at least one removable solvent. The at least one removable solvent may (then), for example, in a method step a"), for example, after the impregnation, for example, after method step a), and, for example, after the optional polymerization and/or cross-linking, for example, after method step a'), and, for example, before the formation of the solid electrode, for example, before method step b), be removed again, for example, by a drying process.

However, it is also possible that the ion-conducting liquid—optionally in addition to the at least one removable solvent—contains at least one remaining, gel-forming solvent, for example, at least one organic carbonate, such as ethylene carbonate and/or propylene carbonate. The at least one remaining, gel-forming solvent may (then), for example, after the removal of the at least one solvent to be removed again, for example, after method step a"), remain in the pores of the porous active material particles. A type of gel electrolyte may thus advantageously be formed directly in the pores of the porous active material and in this way the lithium-ion mobility may be improved.

For example, (furthermore)—in particular in addition to the monomers and/or oligomers and/or the at least one conducting salt—the polymerization initiator and/or the cross-linking initiator and/or linking initiator may be dissolved in the at least one solvent of the ion-conducting liquid, for example, in the at least one removable solvent and/or in the at least one remaining, gel-forming solvent.

If the ion-conducting liquid contains at least one removable solvent, the impregnation with the in particular monomer and/or oligomer containing, ion-conducting liquid, the optional polymerization and/or cross-linking and/or linking, and the removal of the at least one removable solvent, for example, method step a), optionally method step a') and method step a"), may be repeated, for example, at least once, for example, multiple times. The filling degree of the pores of the porous active material with the polymer electrolyte and/or oligomer electrolyte to be formed may thus also advantageously be increased in the case of a solvent-containing, ion-conducting liquid.

The wetting properties of the in particular monomer and/or oligomer-containing, ion-conducting liquid or the at least one solvent of the ion-conducting liquid may be set in particular with respect to the active material used in such a way that the inner pores of the porous active material particles may be wetted completely. The wetting properties may be set in such a way that the wetting angle between the ion-conducting liquid and the porous active material particles is less than 30° and in particular may be close to 0°.

Within the scope of another specific embodiment, the impregnated active material particles are treated using a further liquid before the formation of the solid electrode. The further liquid may contain, for example, at least one gel-forming and/or ion-conductive, for example, lithium-ion-conductive solvent, for example, at least one organic carbonate, and/or at least one liquid electrolyte, for example, made of at least one ion-conductive, in particular lithium-ion-conductive solvent, for example, at least one organic carbonate, and at least one conducting salt, for example, lithium conducting salt. The at least one further liquid may advantageously penetrate into remaining pore volume of the impregnated active material particles and/or may swell the polymer electrolyte and/or oligomer electrolyte to form a gel electrolyte, so that it fills up the pore volume of the impregnated active material particles which may be completely. The ion mobility within the system and therefore the ion conductivity may thus advantageously be increased further.

If the ion-conducting liquid includes monomers and/or oligomers to form a single-ion-conducting polyelectrolyte and/or oligoelectrolyte, the transference number may decrease due to the addition of in particular mobile conducting salts and/or liquid electrolytes. In this case, the further liquid may in particular, for example, solely, contain at least one gel-forming and/or ion-conductive, for example, lithium-ion-conductive solvent, for example, at least one organic carbonate and/or may be free of, in particular free or mobile conducting salts and/or liquid electrolytes. A high transference number, in particular which may be close to 1, may thus advantageously be achieved in this case. Nonetheless, the addition of small quantities of conducting salt and/or liquid electrolyte, in particular in spite of a reduction of the transference number, may also have a positive influence on the overall transport properties of the electrolyte inside the pores of the porous active material particles, for example, upon a joint consideration of the transference number and the ionic conductivity and/or the ion concentration, also in the case of single-ion-conducting polyelectrolyte and/or oligoelectrolyte.

Within the scope of another specific embodiment, the in particular monomer and/or oligomer-containing, ion-conducting liquid furthermore contains monomers and/or oligomers to form an in particular ion-conductive, for example, lithium-ion-conductive polymer, which has a lower glass transition temperature and/or a higher conducting salt solubility and/or coordination capability than the polymer electrolyte and/or oligomer electrolyte formed from the monomers and/or oligomers for forming a polymer electrolyte and/or oligomer electrolyte, in particular single-ion-conducting polyelectrolyte and/or oligoelectrolyte. Thus—although the ion concentration, for example, the lithium-ion concentration may decrease in this way—the ion mobility, for example, the lithium-ion mobility of the electrolyte system and thus in turn the ionic conductivity within the pores of the porous active material particles may advantageously be improved. This may be particularly advantageous if the monomers and/or oligomers for forming a polymer electrolyte and/or oligomer electrolyte are configured to form a single-ion-conducting polyelectrolyte and/or oligoelectrolyte, for example, which—for example, as a result of a high space charge—is only soluble with difficulty or is only soluble in highly polar solvents.

In particular, the in particular monomer and/or oligomer-containing, ion-conducting liquid may therefore include monomers and/or oligomers for forming a single-ion-conducting polyelectrolyte and/or oligoelectrolyte and monomers and/or oligomers for forming an in particular ion-conductive, for example, lithium-ion-conductive polymer having a lower glass transition temperature and/or having a higher conducting salt solubility and/or coordination capability than the polymer electrolyte and/or oligomer electrolyte formed from the monomers and/or oligomers for forming a polymer electrolyte and/or oligomer electrolyte, in particular single-ion-conducting polyelectrolyte and/or oligoelectrolyte, for example, in the form of a mixture. For example, the monomers and/or oligomers may be configured to form a polymer having a lower glass transition temperature and/or higher conducting salt solubility and/or coordination capability, to form at least one polyalkylene oxide, for example, polyethylene oxide and/or polypropylene oxide, and/or a polysiloxane and/or a polyphosphazene, for example, poly[bis((methoxyethoxy)ethoxy)-phosphazene] (MEEP), for example, a functionalized polysiloxane and/or phosphazene, for example, a polyethylene-oxide-functionalized polysiloxane and/or phosphazene.

Within the scope of another specific embodiment, the in particular monomer and/or oligomer-containing, ion-conducting liquid furthermore contains conductive additive nanoparticles, for example, carbon nanoparticles. The electrical conductivity within the pores of the porous active material particles may thus advantageously be improved and an electrical conduction network may be formed inside the pores.

The impregnated active material particles may be embedded in the at least one solid electrolyte, in particular in method step b). The at least one solid electrolyte may become or be situated in particular essentially outside the impregnated active material particles and/or between the impregnated active material particles.

If a solid cathode is manufactured, the at least one solid electrolyte of the solid cathode may in particular also be referred to as a catholyte. If a solid anode is manufactured, the at least one solid electrolyte of the solid anode may in particular also be referred to as an anolyte.

Within the scope of another specific embodiment, the at least one solid electrolyte, for example, the catholyte and/or the anolyte, includes at least one, for example, solid or gel-type polymer electrolyte, for example, at least one single-ion-conducting polyelectrolyte and/or at least one ion-conductive, in particular lithium-ion-conductive polymer, for example, polyethylene oxide, for example, having a molar mass of 400,000 g/mol, in particular in which at least one conducting salt is dissolved, and/or at least one polymer gel electrolyte, for example, based on polyethylene oxide and/or polyacrylonitrile and/or polyvinylidene fluoride, and/or at least one, for example, solid, inorganic, for example, ceramic and/or glass-like ion conductor. For example, the at least one solid electrolyte, for example, the catholyte and/or the anolyte, may be at least one, for example, solid or gel-type polymer electrolyte, for example, at least one single-ion-conducting polyelectrolyte and/or at least one ion-conductive, in particular lithium-ion-conductive polymer, in particular in which at least one conducting salt is dissolved, for example, at least one polymer gel electrolyte, and/or at least one inorganic, for example, ceramic and/or glass-like ion conductor. For example, the at least one solid electrolyte may include at least one polymer electrolyte, for example, at least one single-ion-conducting polyelectrolyte, or at least one inorganic, for example, ceramic and/or glass-like ion conductor or a combination of at least one polymer electrolyte, for example, a single-ion-conducting polyelectrolyte, and at least one inorganic, for example, ceramic and/or glass-like ion conductor, or may be formed therefrom.

The polymer electrolyte formed from the monomers and/or oligomers and the at least one polymer electrolyte of the at least one solid electrolyte may in principle be identical to or different from one another. Within the scope of one special embodiment, the polymer electrolyte formed from the monomers and/or oligomers and the at least one polymer electrolyte of the at least one solid electrolyte are at least similar or identical.

Within the scope of one embodiment, the at least one solid electrolyte, for example, the catholyte and/or the anolyte, includes at least one single-ion-conducting polyelectrolyte. For example, the at least one solid electrolyte may be at least one single-ion-conducting polyelectrolyte. Single-ion-conducting polyelectrolytes may advantageously—in particular because of the covalent bond of the counter anion—have lithium cation transference numbers close to 1. This advantageously enables, in particular in the case of high current densities applied over longer periods of time, the formation of concentration gradients to be significantly reduced, which otherwise result in high overvoltages and could limit the achievable current densities themselves, in relation to conventional polymer electrolytes based on an ion-conductive, in particular lithium-ion-conductive polymer having lithium salt dissolved therein, which typically only have a transference number <0.5, mostly approximately 0.25.

In particular insofar as the at least one solid electrolyte, for example, the catholyte and/or the anolyte, includes at least one polymer electrolyte, the at least one solid electrolyte may optionally furthermore contain at least one gel-forming and/or ion-conductive liquid and/or at least one liquid electrolyte.

For example, the gel-forming and/or ion-conductive liquid of the at least one solid electrolyte may include at least one further gel-forming and/or ion-conductive, in particular lithium-conductive solvent, in particular having a high conducting salt solubility, for example, at least one organic carbonate, for example, ethylene carbonate and/or propylene carbonate, and/or at least one polyether, for example, polyethylene glycol, and/or at least one ionic liquid. The at least one ion-conductive, in particular lithium-ion-conductive polymer of the at least one polymer electrolyte may include or be based on polyethylene oxide, for example.

The at least one liquid electrolyte of the at least one solid electrolyte may include, for example, at least one ion-conductive, in particular lithium-ion-conductive solvent, for example, at least one organic carbonate, and at least one conducting salt, for example, lithium conducting salt. The at least one conducting salt of the at least one solid electrolyte may in particular be identical to the at least one conducting salt of the in particular monomer and/or oligomer-containing, ion-conducting liquid.

Advantageously, a polymer gel electrolyte may be formed and/or the conductivity may be increased by the at least one gel-forming and/or ion-conductive liquid or the at least one liquid electrolyte. The gel-forming and/or ion-conductive liquid or the at least one liquid electrolyte may advantageously swell the at least one polymer electrolyte to form a polymer gel electrolyte. The ion conductivity may thus advantageously be increased further.

If the at least one solid electrolyte includes a single-ion-conducting polyelectrolyte, the transference number may decrease due to the addition of in particular free or mobile conducting salts and/or liquid electrolytes. In this case, the at least one solid electrolyte may in particular, for example, solely include at least one further, gel-forming and/or ion-conductive, for example, lithium-ion-conductive solvent, for example, at least one organic carbonate, and/or may be free of in particular mobile conducting salts and/or liquid electrolytes. A high transference number, in particular which may be close to 1, may thus advantageously be achieved in this case. Nonetheless, if the at least one solid electrolyte may also include single-ion-conducting polyelectrolytes, the addition of small quantities of conducting salt, in particular in spite of a reduction of the transference number, may have a positive influence on the overall transport properties of the electrolyte, for example, upon joint consideration of the transference number and the ionic conductivity and/or the ion concentration.

Within the scope of another embodiment, the at least one solid electrolyte, for example, the catholyte and/or the anolyte, furthermore contains at least one, in particular ion-conductive, for example, lithium-ion-conductive polymer, which has a lower glass transition temperature and/or a higher conducting salt solubility and/or coordination capability than its polymer electrolyte, for example, single-ion-conducting polymer electrolyte. Thus—although the ion concentration, for example, lithium ion concentration may be decreased in this way—the ion mobility, for example, the lithium ion mobility and therefore in turn the ionic conductivity within the at least one solid electrolyte may advantageously be improved. In addition, the mechanical properties and the processing ability of the at least one solid electrolyte may thus advantageously be improved. This may be particularly advantageous if the at least one solid electrolyte includes at least one single-ion-conducting polyelectrolyte, for example, which may only be soluble with difficulty and/or only in highly polar solvents—for example, due to a high space charge.

In particular, the at least one solid electrolyte may therefore include at least one single-ion-conducting polyelectrolyte and at least one polymer having a lower glass transition temperature and/or having a higher conducting salt solubility and/or coordination capability than the single-ion-conducting polyelectrolyte, for example, in the form of a mixture (blend) and/or a copolymer, or may be formed therefrom. For example, the at least one, in particular ion-conductive, for example, lithium-ion-conductive polymer having a lower glass transition temperature and/or having a higher conducting salt solubility and/or coordination capability may include or be at least one polyalkylene oxide, for example, polyethylene oxide and/or polypropylene oxide, and/or polysiloxane and/or polyphosphazene, for example, poly[bis((methoxyethoxy)ethoxy)-phosphazene] (MEEP), for example, a functionalized polysiloxane and/or phosphazene, for example, a polyethylene-oxide-functionalized polysiloxane and/or phosphazene.

The polymer formed from the monomers and/or oligomers having a lower glass transition temperature and/or having a higher conducting salt solubility and/or coordination capability and the at least one polymer having a lower glass transition temperature and/or having a higher conducting salt solubility and/or coordination capability of the at least one solid electrolyte may in principle be identical to or different from one another. Within the scope of one special embodiment, the polymer formed from the monomers and/or oligomers having a lower glass transition temperature and/or having a higher conducting salt solubility and/or coordination capability and the at least one polymer having a lower glass transition temperature and/or having a higher conducting salt solubility and/or coordination capability of the at least one solid electrolyte may be at least similar or identical.

Within the scope of another, additional or alternative embodiment, the at least one solid electrolyte includes at least one, in particular solid, inorganic, for example, ceramic and/or glass-like ion conductor. For example, the at least one inorganic ion conductor may include lithium lanthanum zirconium oxide (LLZO), for example, in the form of nanowires. In particular, the at least one inorganic ion conductor may include or be at least one sulfidic ion conductor.

Sulfidic ion conductors may advantageously have a high transference number and conductivity and low contact transition resistances. Therefore, the ionic contact may advantageously be further improved and polarization overvoltages may be reduced by sulfidic ion conductors. In addition, due to the high transference numbers,—in particular in the case of high surface current densities during charging/discharging—low polarization voltages and therefore a high performance capability, in particular rate capability, of a cell equipped therewith may be achieved. In addition, sulfidic ion conductors may advantageously be manufactured in a simple way.

In addition, sulfidic ion conductors advantageously dissolve almost no sulfur and almost no polysulfides. This in turn has the advantage that in a sulfur cell having a corresponding solid cathode, (poly)sulfides $S_x^{2-}$ arising upon discharge (reduction) in the cathode, which could possibly otherwise migrate to the anode, for example, the lithium anode, and could be reduced there and therefore withdrawn from the electrochemical reaction, which is also referred to as the shuttle mechanism, may be retained better in the cathode and in this way the sulfur utilization and cyclic stability may be improved. In addition, sulfidic ion conductors may advantageously be chemically compatible with sulfurous cathode materials, whereby a degradation of the cathode material may be minimized and in this way the service life of the cell may be extended.

The at least one inorganic, in particular sulfidic ion conductor, may be glass-like, for example.

For example, the at least one inorganic, in particular sulfidic ion conductor may be based on the general chemical formula: $(Li_2S)_x:(P_2S_5)y:D_z$, with $D_z$ standing for one or several additives, for example, LiCl and/or LiBr and/or LiI and/or LiF and/or $Li_2Se$ and/or $Li_2O$ and/or $P_2Se_5$ and/or $P_2O_5$ and/or $Li_3PO_4$ and/or one or several sulfides of germanium, boron, aluminum, molybdenum, tungsten, silicon, arsenic, and/or niobium, in particular germanium. In this case, x, y, and z may stand in particular for component ratios. Such ion conductors may be synthesized, for example, from individual components $Li_2S$ and $P_2S_5$ and optionally D. The synthesis may optionally be carried out under protective gas.

Within the scope of one embodiment, the at least one inorganic, in particular sulfidic ion conductor includes or is a lithium argyrodite and/or a sulfidic glass. These ion conductors have proven to be particularly advantageous, since they may have a high ionic conductivity and low contact transition resistances at the grain boundaries inside the material and in relation to further components, for example, the cathode active material. In addition, these ion conductors may be ductile, because of which they may be used particularly advantageously in porous active materials, which may also have a rough surface, for example. Overall, the long-term stability and performance of a cell equipped with the cathode material may thus advantageously be further improved.

Lithium argyrodites may be understood in particular as compounds which are derived from the mineral argyrodite of the general chemical formula: $Ag_8GeS_6$, silver (Ag) being replaced by lithium (Li) and in particular also germanium (Ge) and/or sulfur (S) being able to be replaced by other elements, for example, of the third, fourth, fifth, sixth, and/or seventh main group.

Examples of lithium argyrodites are:
compounds of the general chemical formula:

$$Li_7PCh_6$$

Ch standing for sulfur (S) and/or oxygen (O) and/or selenium (Se), for example, sulfur (S) and/or selenium (Se), in particular sulfur (S)
compounds of the general chemical formula:

$$Li_6PCh_5X$$

Ch standing for sulfur (S) and/or oxygen (O) and/or selenium (Se), for example, sulfur (S) and/or oxygen (O), in particular sulfur (S), and X standing for chlorine (Cl) and/or bromine (Br) and/or iodine (I) and/or fluorine (F), for example, X standing for chlorine (Cl) and/or bromine (Br) and/or iodine (I),
compounds of the general chemical formula:

$$Li_{7-\delta}BCh_{6-\delta}X_\delta$$

Ch standing for sulfur (S) and/or oxygen (O) and/or selenium (Se), for example, sulfur (S) and/or selenium (Se), in particular sulfur (S), B standing for phosphorus (P) and/or arsenic (As), X standing for chlorine (Cl) and/or bromine (Br) and/or iodine (I) and/or fluorine (F), for example, X standing for chlorine (Cl) and/or bromine (Br) and/or iodine (I), and $0 \leq \delta \leq 1$.

For example, the at least one sulfidic ion conductor may include at least one lithium argyrodite of the chemical formula: $Li_7PS_6$, $Li_7PSe_6$, $Li_6PS_5Cl$, $Li_6PS_5Br$, $Li_6PS_5I$, $Li_{7-\delta}PS_{6-\delta}Cl_\delta$, $Li_{7-\delta}PS_{6-\delta}Br_\delta$, $Li_{7-\delta}PS_{6-\delta}I_\delta$, $Li_{7-\delta}PSe_{6-\delta}Cl_\delta$, $Li_{7-\delta}PSe_{6-\delta}Br_\delta$, $Li_{7-\delta}PSe_{6-\delta}I_\delta$, $Li_{7-\delta}AsS_{6-\delta}Br_\delta$, $Li_{7-\delta}AsS_{6-\delta}I_\delta$, $Li_6AsS_5I$, $Li_6AsSe_5I$, $Li_6PO_5Cl$, $Li_6PO_5Br$, and/or $Li_6PO_5I$. Lithium argyrodites are described, for example, in the publications: Angew. Chem. Int. Ed., 2008, 47, 755-758; Z. Anorg. Allg. Chem., 2010, 636, 1920-1924; Chem. Eur. J., 2010, 16, 2198-2206; Chem. Eur. J., 2010, 16, 5138-5147; Chem. Eur. J., 2010, 16, 8347-8354; Solid State Ionics, 2012, 221, 1-5; Z. Anorg. Allg. Chem., 2011, 637, 1287-1294; and Solid State Ionics, 2013, 243, 45-48.

In particular, the lithium argyrodite may be a sulfidic lithium argyrodite, for example, in which Ch stands for sulfur (S).

Lithium argyrodites may be manufactured in particular by a mechanical-chemical reaction process, for example, where starting materials, such as lithium halogenides, for example, LiCl, LiBr, and/or LiI, and/or lithium chalcogenides, for example, $Li_2S$ and/or $Li_2Se$ and/or $Li_2O$, and/or chalcogenides of the fifth main group, for example, $P_2S_5$, $P_2Se_5$, $Li_3PO_4$ are ground with one another, in particular in stoichiometric quantities. This may be carried out, for example, in a ball mill, in particular a high-energy ball mill, for example, having a speed of 600 RPM. In particular, the grinding may be carried out under a protective gas atmosphere.

For example, the at least one inorganic, in particular sulfidic ion conductor may include at least one sulfidic glass of the chemical formula: $Li_{10}GeP_2S_{12}$, $Li_2S$—$(GeS_2)$—$P_2S_5$, and/or $Li_2S$—$P_2S_5$. For example, the at least one sulfidic ion conductor may include a germanium-containing, sulfidic glass, for example, $Li_{10}GeP_2S_{12}$ and/or $Li_2S$—$(GeS_2)$—$P_2S_5$, in particular $Li_{10}GeP_2S_{12}$. Sulfidic lithium-ion conductors may advantageously have a high lithium-ion conductivity and chemical stability.

Within the scope of one special embodiment, the at least one inorganic, in particular sulfidic ion conductor includes or is a lithium argyrodite. Lithium argyrodites are advantageously distinguished by particularly low contact transition resistances at the grain boundaries within the material and in relation to further components, for example, the porous active material particles. Particularly good ion conduction at and inside the grain interfaces may thus advantageously be achieved. Lithium argyrodites may advantageously also have a low transition resistance between grains without a sintering process. The manufacture of the electrode or the cell may thus advantageously be simplified.

The formation of the solid electrode may be carried out, in particular in method step b), by embedding the impregnated active material particles in further electrode components. For example, the solid electrode, in particular in method step b), may be formed from the impregnated active material particles and at least one solid electrolyte and optionally at least one conductive additive. The at least one conductive additive may include or be, for example, at least one carbon modification, for example, carbon black and/or graphite. The at least one conductive additive may advantageously form a percolating electrically conductive network with itself and/or with active material, in particular if the active material is sufficiently electrically conductive. The electrical conductivity between the impregnated active material particles may thus advantageously also be improved and an electrical conductive network may be formed within the solid electrode.

For example, the monomers and/or oligomers for forming a polymer electrolyte and/or oligomer electrolyte, for example, the monomers and/or oligomers for forming a single-ion-conducting polyelectrolyte and/or oligoelectrolyte, and/or the at least one solid electrolyte, in particular the at least one polymer electrolyte, for example, single-ion-conducting polyelectrolyte, of the at least one solid electrolyte, may include at least one unit of the general chemical formula:

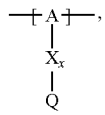

and/or at least one (singly or multiply) fluorinated, for example, perfluorinated, and/or lithium-sulfonate-substituted polymer, for example, a perfluoropolyether and/or a lithium-sulfonate-substituted, in particular fluorinated, for example, perfluorinated polyolefin, for example, tetrafluoroethylene polymer, and/or a lithium-sulfonate-substituted, in particular fluorinated, for example, perfluorinated polyether, for example, a lithium-ion-containing, for example, lithium-ion-exchanged Nafion, and/or a lithiumsulfonate-substituted, in particular fluorinated, for example, perfluorinated polyphenylene, and/or may be configured for the formation thereof.

The polymer electrolyte and/or oligomer electrolyte formed from the monomers and/or oligomers and/or the at least one polymer electrolyte of the at least one solid electrolyte may include or be, for example, a homopolymer and/or a copolymer, for example, a block copolymer, optionally a multi-block copolymer, and/or an alternating copolymer and/or a random copolymer, and/or a polymer mixture, for example, of one or several homopolymers and/or one or several copolymers, for example, a homopolymer-copolymer mixture.

Within the scope of another specific embodiment, the polymer electrolyte formed from the monomers and/or oligomers and/or the at least one polymer electrolyte of the at least one solid electrolyte includes a polyalkylene oxide and/or a polymer having at least one alkylene oxide group, in particular an oligo-alkylene oxide group. The ion mobility and therefore the ion conductivity may advantageously be increased by alkylene oxide units or groups. Such polymers are only ion-conductive, in particular lithium-ion-conductive, however, and are to be used in combination, for example, in a mixture, with at least one conducting salt, for example, an alkali metal conducting salt, for example, lithium conducting salt, and/or single-ion-conducting polyelectrolyte and/or oligoelectrolyte. For example, the polymer electrolyte formed from the monomers and/or oligomers and/or the at least one polymer electrolyte of the at least one solid electrolyte may include a polyethylene oxide and/or a propylene oxide and/or a polymer having at least one ethylene oxide group and/or propylene oxide group, for example, oligo-ethylene oxide group and/or oligo-propylene oxide group. In particular, the polymer electrolyte formed from the monomers and/or oligomers and/or the at least one polymer electrolyte of the at least one solid electrolyte may include a polyethylene oxide and/or a polymer having at least one ethylene oxide group, in particular oligo-ethylene oxide group. For example, the monomers and/or oligomers for forming a polymer electrolyte and/or oligomer electrolyte may include acrylates, for example (ethylene glycol) methylether acrylate (EGMA), and/or the polymer electrolyte formed from the monomers and/or oligomers and/or the at least one polymer electrolyte of the at least one solid electrolyte may include a polyacrylate, for example, poly(ethylene glycol) methylether methacrylate (PEGMA) or may be based thereon.

Within the scope of another specific embodiment, the monomers and/or oligomers for forming a polymer electrolyte and/or oligomer electrolyte, for example, the monomers and/or oligomers for forming a single-ion-conducting polyelectrolyte and/or oligoelectrolyte, and/or the at least one solid electrolyte, in particular the at least one polymer electrolyte, for example, single-ion-conducting polyelectrolyte, of the at least one solid electrolyte, include at least one unit of the general chemical formula:

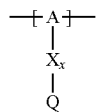

or are configured for the formation thereof.

In this case, -[A]- stands for a unit which forms a polymer backbone or oligomer backbone, respectively. X stands for a spacer, in particular a spacer bound, for example, covalently, to the unit -[A]- which forms the polymer backbone or oligomer backbone. In this case, x stands for the number, in particular the presence or the absence of the spacer X. In particular, x may be 1 or 0, for example, 1. In the case x=1, a spacer X may be provided in particular. In the case x=0, in particular no spacer may be provided. Q stands for a group which is bound, in particular covalently, to spacer X (in the case x=1) or to the polymer backbone or oligomer backbone -[A]- (in the case x=0). In particular, group Q may be bound via spacer X to unit -[A]-, which forms the polymer backbone or oligomer backbone. In the case x=1 (presence of the spacer), group Q, for example, negatively charged group $Q^-$ or uncharged group Q or positively charged group $Q^+$, which is explained hereafter, may be bound to spacer X in particular. In the case x=0 (absence of the spacer), group Q, for example, negatively charged group $Q^-$, which is explained hereafter, or uncharged group Q or positively charged group $Q^+$ may be bound, in particular directly, to polymer backbone or oligomer backbone -[A]-.

Such polymers and/or oligomers may advantageously have an ion conductivity, for example, lithium-ion conductivity, in particular as a function of the temperature, of $\geq 10^{-5}$ S/cm, possibly even $\geq 10^{-4}$ S/cm, and may advantageously be used both as an ion conductor, for example, a lithium-ion conductor, and also as a binder. The transference number or the mobility of the ions, for example, lithium ions, and therefore the ion conductivity, in particular the lithium-ion conductivity, may advantageously be influenced and/or increased by group Q, for example, $Q^-$ or Q or $Q^+$. Because group Q is bound directly or indirectly to polymer backbone or oligomer backbone -[A]-, advantageously—in comparison to mixtures of similar polymers and similar, but free or unbound groups Q—a localization of group Q, for example, $Q^-$ or Q or $Q^+$ may be achieved. In turn, by way of a localization of group Q, for example, $Q^-$ or Q or $Q^+$, diffusing away of group Q and, for example, the side reactions which otherwise accompany this, for example, swelling of the separator and/or an anode protection layer and/or a degradation of the anode, which could occur in the case of low-molecular ether compounds, for example, may in turn advantageously be prevented and the mechanical stability and, for example, binder function may be improved. In addition, such polymers may have an extremely low vapor pressure—compared to liquid electrolytes—which enables a cell equipped therewith to be safely operated at higher operating temperatures. Advantageously, further properties, such as the glass transition temperature and/or other properties of the polymer or polymer electrolyte may additionally be set by spacer X—for example, by the type of the spacer and/or the length of the spacer—and/or unit -[A]- which forms the polymer backbone or oligomer backbone—for example, by the type of unit(s) -[A]- which form the polymer backbone or oligomer backbone and the structure thereof. In particular the glass transition temperature and/or the mechanical properties of the polymer or polymer electrolyte may advantageously be set by spacer X. Unit -[A]- which forms the polymer backbone or oligomer backbone may optionally be optimized with respect to other properties, for example, mechanical properties. Overall, the manufacture and the construction of cells may thus advantageously be simplified or the capacitance preservation or cycle stability, service life, and safety thereof may be increased. Such polymers and/or oligomers, in particular as an electrolyte, for example, solid electrolyte, may particularly advantageously be used in combination with a cathode active material based on a sulfur-carbon composite, in particular sulfur-polymer and/or carbon modification composite, for example, a sulfur-polymer composite, for example, a composite of an in particular electrically conductive polymer with in particular covalently bound sulfur, for example, a sulfur-polyacrylonitrile composite, such as SPAN, and/or may be used in an alkali metal-sulfur cell, for example, a lithium-sulfur cell and/or sodium-sulfur cell, in particular a lithium-sulfur cell.

Within the scope of one specific embodiment, Q stands for a negatively charged group $Q^-$, for example, a negatively charged side group $Q^-$, and a counter ion $Z^+$. In particular, negatively charged group $Q^-$ may be bound via spacer X to unit -[A]-, which forms the polymer backbone or oligomer backbone. Negatively charged group $Q^-$ may stand, for example, for a group based on a conducting salt anion, for example, an alkali metal conducting salt anion, for example, a lithium conducting salt anion and/or sodium conducting salt anion, in particular a lithium conducting salt anion, and/or for a group based on an anion of an imide, for example, for a sulfonyl imide group, for example, for a trifluoromethane sulfonyl imide group (TFSI$^-$: $F_3C$—$SO_2$—$(N^-)$—$SO_2$—) and/or perfluoroethane sulfonyl imide group (PFSI$^-$: $F_5C_2$—$SO_2$—$(N^-)$—$SO_2$—) and/or fluorosulfonyl imide group (FSI: F—$SO_2$—$(N^-)$—$SO_2$—) and/or for a group based on an anion of an ionic liquid, for example, for a pyrazolide group or for an imidazolide group and/or for a sulfonate group, for example, for a (single) sulfonate group or for a trifluoromethane sulfonate group (triflate, —$SO_3CF_2$—), and/or for a sulfate group and/or for a carboxylate group and/or for a group based on a phosphoric-acid-based anion, in particular for a phosphate group and/or for a group based on anion of an amide, for example, for a group based on an anion of a secondary amide (—R—NHR), and/or for a group based on an anion of a carboxylic acid amide, for example, for a group based on an anion of a secondary carboxylic acid amide (—CO—NHR).

Counter ion $Z^+$ may be, for example, an in particular electrochemically active cation, in particular metal ion, for example, an alkali metal ion, for example, a lithium ion and/or sodium ion. In particular, $Z^+$ may stand for a lithium ion ($Li^+$).

Polymer electrolytes and/or oligomer electrolytes which are formed from monomers and/or oligomers, in which Q stands for a negatively charged group $Q^-$ and a counter ion $Z^+$, in particular a metal ion, for example, an alkali metal ion, for example, a lithium ion or sodium ion, in particular a lithium ion, may be referred to as single-ion-conducting polyelectrolytes and/or oligoelectrolytes.

Such single-ion-conducting polyelectrolytes may advantageously already have sufficient ion conductivity, in particular lithium-ion conductivity, due to counter ion Z. Therefore, such single-ion-conducting polyelectrolytes may be used or may be ion-conducting, in particular lithium-ion-conducting, without the addition of a conducting salt, for example, lithium conducting salt. Cations, for example, lithium ions ($Li^+$) may be coordinated or solvated by negatively charged group $Q^-$. Very high transference numbers close to 1 may be achieved, in particular by the covalent bonding of negatively charged group $Q^-$ to unit -[A]-, which forms the polymer backbone or oligomer backbone, whereby—in particular in the case of high surface current densities during charging/discharging—low polarization voltages and therefore a high performance of a cell equipped therewith may be achieved. To reduce the glass transition temperature and/or to increase the ion mobility and/or the ion conductivity—but at the cost of a reduced transference number—such single-ion-conducting polyelectrolytes may optionally also be used in combination, for example, in a mixture, with at least one conducting salt, for example, lithium conducting salt. An increase of the ion concentration and/or mobility, in particular lithium-ion concentration and mobility—in spite of a reduced transference number—may be advantageous overall for the transport properties of the electrolyte.

In particular, negatively charged group $Q^-$ may stand for a sulfonyl imide group, in particular a trifluoromethane sulfonyl imide group ($F_3C$—$SO_2$—$(N^-)$—$SO_2$—) and/or perfluoroethane sulfonyl imide group ($F_5C_2$—$SO_2$—$(N^-)$—$SO_2$—) and/or fluorosulfonyl imide group (F—$SO_2$—$(N^-)$—$SO_2$—), in particular for a trifluoromethane sulfonyl imide group, and/or for a sulfonate group, in particular for a (single) sulfonate group and/or for a trifluoromethane sulfonate group. For example, negatively charged group $Q^-$ may stand for a trifluoromethane sulfonyl imide group or a perfluoroethane sulfonyl imide group or fluorosulfonyl imide group or a sulfonate group or a trifluoromethane sulfonate group. Within the scope of one special embodiment, negatively charged group $Q^-$ may stand for a sulfonate group or a sulfonyl imide group, in particular for a sulfonate group. $Z^+$ may stand in particular for a lithium ion. A comparatively weak coordination of cations, in particular lithium ions, which thereby increases the ion mobility, in particular lithium ion mobility, and ion conductivity, in particular lithium-ion conductivity, may advantageously be achieved by a sulfonyl imide group or a sulfonate group, in particular a sulfonyl imide group. $Z^+$ may stand in particular for a lithium ion.

For example, negatively charged group $Q^-$ may stand for a benzene group, which is substituted with at least one group based on a conducting salt anion, in particular a lithium conducting salt anion, and/or with at least one group based on an anion of an imide, in particular with at least one sulfonyl imide group (benzene sulfonyl imide group, for example, lithium benzene sulfonyl imide group), and/or with at least one group based on an anion of an ionic liquid and/or with at least one sulfonate group (benzene sulfonate group, for example, lithium benzene sulfonate group) and/or with at least one sulfate group and/or with at least one carboxylate group and/or with at least one group based on a phosphoric-acid-based anion, in particular with at least one phosphate group, and/or with at least one group based on an anion of an amide and/or with at least one group based on an anion of a carboxylic acid amide. For example, negatively charged group $Q^-$ may stand for benzene group which is substituted with at least one trifluoromethane sulfonyl imide group and/or with at least one perfluoroethane sulfonyl imide group and/or with at least one fluorosulfonyl imide group, in particular with at least one trifluoromethane sulfonyl imide group. Within the scope of one embodiment, $Q^-$ stands for a benzene sulfonate group or a benzene sulfone imide group, in particular a benzene sulfonate group. A benzene group advantageously enables a group, for example, a sulfonate, to be bonded in a simple manner to greatly varying polymer backbones or oligomer backbones. In addition, a benzene group offers the possibility of bonding on further substituents which increase the ion conductivity in a simple way, such as multiple groups, for example, sulfonate groups, and/or one or several alkylene oxide group(s). A polymer and/or oligomer having a benzene group, in particular functionalized in this way, may advantageously be formed in a simple way by polymerization of the double bond of a styrene, which is functionalized in this way in particular, for example, 4-(styrene sulfonyl) (trifluoromethane sulfonyl) imide, or a styrene functionalized with the above-mentioned anionic groups. The linking of the anionic function to a polymer backbone or oligomer backbone may also be carried out via a functional group in para-position in relation to the anionic group in the aromatic carbon six-member ring. In addition, an aromatic carbon six-member ring offers the possibility of bonding on further substituents which increase the ion conductivity in a simple way.

For example, negatively charged group $Q^-$ may therefore stand for a benzene sulfonyl imide group, for example, a para and/or ortho and/or meta-benzene sulfonyl imide group, for example, a para-benzene sulfonyl imide group, and/or a benzene sulfonate group, for example, for a benzene sulfonate group, for example, a para and/or ortho and/or meta-benzene sulfonate group, for example, a para-benzene sulfonate group. Benzene sulfonyl imide groups and/or benzene sulfonate groups, for example, a para, ortho, and/or meta-benzene sulfonyl imide group and/or para, ortho, and/or meta-benzene sulfonate group, in particular a para-benzene sulfonyl imide group and/or a para-benzene sulfonate group, may be particularly advantageous as explained above.

For example, $Q^-$ may stand for a sulfonyl imide group, for example, a benzene sulfonyl imide group. A coordination of cations, in particular lithium ions, which is comparatively weak and thereby increases the ion mobility, in particular lithium ion mobility, and ion conductivity, in particular lithium-ion conductivity, may thus advantageously be achieved by the soft anion.

For example, however, $Q^-$ may also stand for a sulfonate group, for example, a benzene sulfonate group.

If Q includes a negatively charged group $Q^-$, the monomers and/or oligomers for forming a polymer electrolyte and/or oligomer electrolyte, in particular a single-ion-conducting polyelectrolyte and/or oligoelectrolyte, and/or the at least one solid electrolyte, in particular the single-ion-conducting polyelectrolyte of the at least one solid electrolyte, may include, for example, a unit of the general chemical formula:

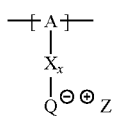

or may be configured for the formation thereof.

Q may also stand—within the scope of another, in particular alternative or additional specific embodiment—for an uncharged group Q, however, for example, an uncharged, functional side group, which is capable of coordinating or solvating in particular electrochemically active cations, for example, metal ions, for example, alkali metal ions, for example, lithium ions and/or sodium ions, in particular lithium ions. In particular, uncharged group Q may be bound via a spacer X to unit -[A]-, which forms the polymer backbone or oligomer backbone. Uncharged group Q may stand, for example, for a group which may be derived from an electrolyte solvent, for example, an alkylene oxide, for example, ethylene oxide, and/or a cyclic carbonate, for example, ethylene carbonate and/or propylene carbonate, and/or a lactone.

Cations of conducting salts, for example, lithium conducting salts, in particular lithium ions, may be coordinated or solvated by an uncharged group Q. Thus, the mobility of the cations, for example, lithium ions, may advantageously be increased in particular by the introduction of a group which may be derived from an electrolyte solvent, and thereby the ion conductivity of the polymer and/or oligomer electrolyte may be increased.

Polymers and/or oligomers which only have uncharged groups Q may initially only be ion-conductive, for example, lithium-ion-conductive, and may be or become ion-conducting, for example, lithium-ion-conducting by combination with units having a negatively charged group $Q^-$ and a counter ion $Z^+$, for example, a single-ion-conducting polyelectrolyte and/or oligoelectrolyte, for example, as a copolymer and/or mixture (blend), and/or become ion-conducting, for example, lithium-ion-conducting by adding a conducting salt, for example, an alkali metal conducting salt, in particular a lithium conducting salt, and in particular solvation of the salt. In particular, polymers and/or oligomers which include an uncharged group Q may therefore be used in combination, for example, as a copolymer and/or in a mixture, with units having a negatively charged group $Q^-$ and a counter ion $Z^+$, for example, a single-ion-conducting polyelectrolyte and/or oligoelectrolyte, and/or with at least one conducting salt, for example, an alkali metal conducting salt, for example, a lithium conducting salt and/or sodium conducting salt, in particular a lithium conducting salt.

In particular, uncharged group Q may stand for a group which may be derived in particular from an electrolyte solvent, for example, for a cyclic carbonate group or an in particular cyclic lactone group or a cyclic carbamate group or an acyclic carbonate group or an acyclic carboxylic acid ester group or an acyclic carbamate group or an alkylene oxide group, in particular an oligo-alkylene oxide group. A cyclic carbonate group or lactone group or cyclic carbamate group or acyclic carbonate group or acyclic carboxylic acid ester group or acyclic carbamate group or alkylene oxide group, for example, oligo-alkylene oxide group, may be advantageous, since in this way the mobility of alkali ions, for example, lithium ions, and therefore the ion conductivity, in particular lithium-ion conductivity, of the polymer electrolyte and/or oligomer electrolyte may advantageously be increased.

Within the scope of one embodiment, Q stands for an alkylene oxide group, in particular an oligo-alkylene oxide group. The glass temperature may thus advantageously be reduced and/or the lithium-ion conductivity may be increased.

Within the scope of another embodiment, uncharged group Q stands for a cyclic carbonate group or a lactone group or a cyclic carbamate group or an acyclic carbonate group or an acyclic carboxylic acid ester group or an acyclic carbamate group. For example, uncharged group Q may stand for an in particular cyclic or acyclic carboxylic acid ester group, for example, a carbonate group and/or lactone group. Due to the high polarity of these groups, these groups may advantageously increase the ion dissociation and the dielectric constant of the polymer or polymer electrolyte and thereby advantageously reduce the polysulfide solubility, which may be particularly advantageous in particular in the case of sulfur-polyacrylonitrile composites, such as SPAN.

For example, the in particular uncharged group Q may stand for a cyclic carbonate group or a lactone group or a carbamate group, in particular a cyclic carbamate group or an acyclic carbamate group. In particular, Q may stand for a cyclic carbonate group or an in particular cyclic lactone group or a cyclic carbamate group. Cyclic carbonate groups, lactone groups, and/or cyclic carbonate groups may be particularly advantageous overall to increase the ion conductivity of the polymer.

Within the scope of one special embodiment, Q stands for a cyclic carbonate group, for example, which forms a five-member ring or a six-member ring or a seven-member ring, in particular a five-member ring. Within the scope of another special embodiment of this specific embodiment, Q stands for a lactone group, for example, which forms a five-member ring or a six-member ring or a seven-member ring, in particular a five-member ring. Within the scope of another special embodiment of this specific embodiment, Q stands for a cyclic carbamate group, for example, which forms a five-member ring or a six-member ring or a seven-member ring, in particular a five-member ring. Within the scope of another special embodiment of this specific embodiment, Q stands for an acyclic carbonate group. Within the scope of another special embodiment of this specific embodiment, Q stands for an acyclic carboxylic acid ester group. Within the scope of another special embodiment of this specific embodiment, Q stands for an acyclic carbamate group.

Within the scope of another embodiment, Q stands for hydrogen or an alkyl group, in particular a methyl group or an ethyl group.

If Q is a neutral group, the monomers and/or oligomers for forming a polymer electrolyte and/or oligomer electrolyte and/or the at least one solid electrolyte, in particular polymer electrolyte, for example, may include a unit of the general chemical formula:

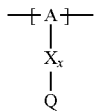

or may be configured for the formation thereof.

However, Q may—within the scope of another, in particular alternative or additional specific embodiment—also stand for a positively charged group $Q^+$, for example, a positively charged side group $Q^+$, and a counter ion $Z^-$. In particular, positively charged group $Q^+$ may be bound via spacer X to unit -[A]-, which forms the polymer backbone or oligomer backbone. Positively charged group $Q^+$ may stand, for example, for a group based on a cation of an ionic liquid.

In particular, positively charged group $Q^+$ may stand for a group based on a cation of an ionic liquid, for example, for a pyridinium group or an, in particular quaternary, ammonium group or an imidazolium group or a piperidinium group or a pyrollidinium group or an, in particular quaternary, phosphonium group or a guanidinium group or a morpholinium group or a uronium group or a thiouronium group.

A pyridinium group may be understood in particular as a group which may be derived from pyridinium, and is in particular substituted or unsubstituted. An ammonium group may be understood in particular as a group which may be derived from ammonium, in particular a quaternary ammonium group. An imidazolium group may be understood in particular as a group which may be derived from imidazolium, and is in particular substituted or unsubstituted. A piperidinium group may be understood in particular as a group which may be derived from piperidinium, and is in particular substituted or unsubstituted. A pyrollidinium group may be understood in particular as a group which may be derived from pyrollidinium, and is in particular substituted or unsubstituted. A phosphonium group may be understood in particular as a group which may be derived from phosphonium, in particular a quaternary phosphonium group. A guanidinium group may be understood in particular as a group which may be derived from guanidinium, and is substituted or unsubstituted in particular. A morpholinium group may be understood in particular as a group which may be derived from morpholinium, and is substituted or unsubstituted in particular. A uronium group may be understood in particular as a group which may be derived from uronium, and is substituted or unsubstituted in particular. A thiouronium group may be understood in particular as a group which may be derived from thiouronium, and is substituted or unsubstituted in particular.

In particular an anion $Z^-$ may be included as the counter ion to the positive charge of $Q^+$. Counter ion $Z^-$ may be, for example, an in particular typical conducting salt anion for example, an alkali metal conducting salt anion, for example, a lithium conducting salt anion and/or sodium conducting salt anion, in particular a lithium conducting salt anion.

In particular anions of conducting salts may be coordinated or solvated by a positively charged group $Q^+$ and in particular the dissociation of the conducting salt may be increased. The mobility of the ions of the conducting salt and therefore the ion conductivity, in particular the lithium-ion conductivity, of the polymer electrolyte may thus advantageously in turn also be increased. Unit-[A]- which forms the polymer backbone or oligomer backbone and/or spacer X may also optionally be optimized with respect to other properties. In particular, polymers and/or oligomers which have a positively charged group $Q^+$ may be used in combination, for example, in a mixture, with at least one conducting salt, for example, an alkali metal conducting salt, for example, a lithium conducting salt and/or sodium conducting salt, in particular a lithium conducting salt.

For example, positively charged group $Q^+$ may stand for a pyridinium group or an, in particular quaternary, ammonium group or an imidazolium group or a piperidinium group or a pyrollidinium group or an, in particular quaternary, phosphonium group or a guanidinium group or a morpholinium group or a uronium group or a thiouronium group, the proton(s) of which is/are substituted by a substituent. In particular, positively charged group $Q^+$ may stand for a pyridinium group or an, in particular quaternary, ammonium group or an imidazolium group or a piperidinium group or a pyrollidinium group or an, in particular quaternary, phosphonium group. For example, $Q^+$ may stand for an, in particular quaternary, ammonium group or an imidazolium group or a pyridinium group.

For example, all typical counter ions of known lithium salts, in particular lithium conducting salts, may be used as counter ion $Z^-$. In particular, $Z^-$ may therefore stand for an anion, in particular a lithium conducting salt anion. Groups $Q^+$ which are based on a cation of an ionic liquid, in particular pyridinium groups, ammonium groups, imidazolium groups, piperidinium groups, pyrollidinium groups, phosphonium groups, guanidinium groups, morpholinium groups, uronium groups, and/or thiouronium groups, may advantageously increase the dissociation of alkali ions, in particular lithium ions, for example, of the conducting salt and/or inorganic ion conductor, and thus in turn the transference number and optionally the mobility of the alkali ions, in particular lithium ions, and thereby the ion conductivity, in particular the lithium-ion conductivity, and the dielectric constant are advantageously increased and thus the polysulfide solubility is reduced.

Within the scope of one embodiment, Z stands for a lithium conducting salt anion. A dissociation of a lithium conducting salt may thus advantageously be increased and in this way the mobility of the lithium ions of the lithium conducting salt and thus the lithium-ion conductivity may also be increased.

For example, $Z^-$ may stand for perchlorate ($ClO_4^-$) and/or trifluoromethane sulfonate (triflate$^-$, $F_3CSO_3^-$), and/or tetrafluoroborate ($BF_4^-$) and/or bisoxalatoborate ($BOB^-$,

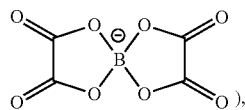 [SMILES: O=C1O[B-]2(OC1=O)OC(=O)C(=O)O2]

and/or hexafluorophosphate ($PF_6^-$) and/or bis(trifluoromethane sulfonyl) imide (TFSI$^-$: $F_3C$—$SO_2$—($N^-$)—$SO_2$—$CF_3$) and/or bis(perfluoroethane sulfonyl) imide and/or bis(fluorosulfonyl) imide, in particular bis(trifluoromethane sulfonyl) imide, and/or difluorooxalatoborate (DFOB$^-$:

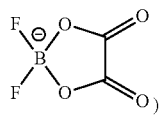

and/or bromide (Br$^-$) and/or iodide (I$^-$) and/or chloride (Cl$^-$). These anions are frequently used as the lithium conducting salt anion. Therefore, these anions may particularly advantageously be used for solvating lithium conducting salts.

In particular, $Z^-$ may stand for bis(trifluoromethane sulfonyl) imide and/or bis(perfluoroethane sulfonyl) imide and/or bis(fluorosulfonyl) imide, in particular bis(trifluoromethane sulfonyl) imide trifluoromethane sulfonate, trifluoromethane sulfonate, and/or tetrafluoroborate and/or bisoxalatoborate, and/or difluorooxalatoborate and/or bromide and/or iodide and/or chloride. A higher thermal stability may thus advantageously be achieved.

Within the scope of one special embodiment, Z stands for bis(trifluoromethane sulfonyl) imide (TFSI$^-$: $F_3C$—$SO_2$—($N^-$)—$SO_2$—$CF_3$) and/or bis(perfluoroethane sulfonyl) imide (BETI$^-$: $F_5C_2$—$SO_2$—($N^-$)—$SO_2$—$C_2F_5$) and/or bis(fluorosulfonyl) imide (FSI: F—$SO_2$—($N^-$)—$SO_2$—F), in particular bis(trifluoromethane sulfonyl) imide, and/or trifluoromethane sulfonate (triflate, $SO_3CF_3$). A comparatively weak coordination of cations, in particular lithium ions, which thereby increases the ion mobility, in particular lithium ion mobility, and ion conductivity, in particular lithium-ion conductivity, may be achieved by large, soft anions, such as bis(trifluoromethane sulfonyl) imide and/or bis(perfluoroethane sulfonyl) imide and/or bis(fluorosulfonyl) imide and/or trifluoromethane sulfonate, in particular bis(trifluoromethane sulfonyl) imide (TFSI$^-$), and, for example, the solubility of conducting salts in the polymer and/or oligomer and optionally the thermal stability may be improved.

If Q includes a positively charged group Q$^+$, the monomers and/or oligomers for forming a polymer electrolyte and/or oligomer electrolyte and/or the at least one solid electrolyte, in particular the at least one polymer electrolyte of the at least one solid electrolyte, may include, for example, a unit of the general chemical formula:

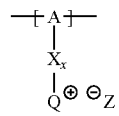

or may be configured for the formation thereof.

Spacer X may include in particular at least one, in particular substituted or unsubstituted, saturated or unsaturated, linear or branched alkylene group and/or at least one, in particular substituted or unsubstituted, saturated or unsaturated, linear or branched alkylene oxide group and/or at least one, in particular substituted or unsubstituted phenylene oxide group, for example, oligo-phenylene oxide group, in particular having $\geq 1$ or $\geq 2$ to $\leq 10$ repetition units, and/or at least one, in particular substituted or unsubstituted phenylene group, for example, oligo-phenylene group, in particular having $\geq 1$ or $\geq 2$ to $\leq 10$ repetition units, and/or at least one, in particular substituted or unsubstituted benzylene group, for example, oligo-benzylene group, in particular having $\geq 1$ or $\geq 2$ to $\leq 10$ repetition units, and/or at least one carbonyl group, in particular ketone group, for example, alkyl carbonyl group, and/or at least one cyclic carbonate group and/or at least one lactone group and/or at least one cyclic carbamate group and/or at least one acyclic carbonate group and/or at least one acyclic carboxylic acid ester group and/or at least one acyclic carbamate group and/or at least one ether oxygen and/or at least one positively charged group, for example, at least one, in particular quaternary, ammonium ion group and/or at least one imidazolium group and/or at least one piperidinium group and/or at least one pyrollidinium group and/or at least one, in particular quaternary, phosphonium group and/or at least one guanidinium group and/or at least one morpholinium group and/or at least one uronium group and/or at least one thiouronium group, and/or at least one negatively charged group, for example, at least one sulfonate group and/or trifluoromethane sulfonyl imide group, for example, at least one lithium sulfonate group and/or lithium trifluoromethane sulfonyl imide group, in particular a lithium benzene sulfonate group and/or lithium trifluoromethane sulfonyl imide benzene group. Spacer X may also have a combination of these groups. The ion conductivity of the polymer or polymer electrolyte may advantageously be increased as a whole by such a spacer X, for example, the polymer backbone or oligomer backbone being able to be optimized with respect to other properties thereby. By introducing at least one—optionally additional—cyclic carbonate group and/or lactone group and/or cyclic carbamate group and/or acyclic carbonate group and/or acyclic carboxylic acid ester group and/or acyclic carbamate group and/or positively charged group, in particular based on a cation of an ionic liquid, for example, an, in particular quaternary, ammonium ion group and/or a pyridinium group and/or imidazolium group and/or a piperidinium group and/or a pyrollidinium group and/or an, in particular quaternary, phosphonium group and/or a guanidinium group and/or a morpholinium group and/or a uronium group and/or a thiouronium group, and/or a negatively charged group, for example, a sulfonyl imide group and/or sulfonate group into spacer X, the ion conductivity—in particular as explained in conjunction with corresponding groups Q, Q$^+$, and Q$^-$—may advantageously be increased further.

For example, spacer X may include at least one, in particular substituted or unsubstituted, saturated or unsaturated, linear or branched alkylene oxide group, in particular oligo-alkylene oxide group. Spacer X may include, for example, at least one, for example, substituted or unsubstituted, saturated or unsaturated, linear or branched ethylene oxide group and/or propylene oxide group, in particular oligo-ethylene oxide group and/or oligo-propylene oxide group. In particular, spacer X may include at least one, for example, substituted or unsubstituted, saturated or unsaturated, linear or branched ethylene oxide group, in particular oligo-ethylene oxide group. The ion mobility may thus advantageously be increased. This may be particularly advantageous in the case of a positively charged group $Q^+$ and/or in the case of a negatively charged group $Q^-$, in particular to mobilize dissociated ions and increase the ion conductivity in this way.

The at least one alkylene oxide group of spacer X may in particular be partially or completely halogenated, in particular fluorinated, for example, perfluorinated. The solubility of polysulfides by the polymer or the polymer electrolyte, in particular by alkylene oxide groups, may advantageously be reduced by halogenation, in particular fluorination, for example, perfluorination, which may be particularly advantageous upon use in combination with a sulfur-carbon composite, for example, sulfur-polymer and/or carbon modification composite, in particular sulfur-polymer composite with sulfur which is bound, for example, covalently and/or ionically, in particular covalently, to the polymer of the composite, for example, a sulfur-polyacrylonitrile composite, for example, a SPAN composite, as a cathode material.

Spacer X may also include, for example, at least one carbonyl group, in particular at least one cyclic carbonate group and/or at least one lactone group and/or at least one cyclic carbamate group and/or at least one acyclic carbonate group and/or at least one acyclic carboxylic acid ester group and/or at least one acyclic carbamate group. The ion mobility may thus also advantageously be increased. This may be particularly advantageous in the case of a positively charged group $Q^+$ and/or in the case of a negatively charged group $Q^-$, in particular to mobilize dissociated ions and to increase the ion conductivity in this way.

Spacer X may also include, for example, at least one, possibly another, negatively charged group $Q^-$ and a counter ion $Z^+$, for example, an alkali ion, for example, a lithium ion and/or sodium ion, in particular a lithium ion. The at least one, possibly another, negatively charged group $Q^-$ of the spacer may in particular be formed as explained above, in particular within the scope of negatively charged group $Q^-$, which is bonded via spacer X. For example, the at least one, possibly another, negatively charged group $Q^-$, of spacer X may be a group based on a conducting salt anion, in particular a lithium conducting salt anion, and/or an anion of an ionic liquid and/or a sulfonate group. For example, spacer X may include at least one sulfonyl imide group, for example, at least one trifluoromethane sulfonyl imide group and/or at least one perfluoroethane sulfonyl imide group and/or at least one fluorosulfonyl imide group, in particular at least one trifluoromethane sulfonyl imide group, and/or at least one sulfonate group. The ion dissociation may thus advantageously be increased. This may be particularly advantageous in the case of a negatively charged group $Q^-$ and/or in the case of an uncharged group Q, in particular to further increase the ion conductivity and further reduce the polysulfide solubility.

The at least one alkylene group of spacer X may have, for example, a chain length of $\geq 1$ to $\leq 16$ carbon atoms, in particular $\geq 1$ to $\leq 13$ carbon atoms, for example, $\geq 1$ to $\leq 4$ carbon atoms or $\geq 4$ to $\leq 8$ carbon atoms and/or $\geq 9$ to $\leq 13$ carbon atoms. For example, the alkylene group of spacer X may stand for a saturated alkylene group, for example, of the general chemical) formula: —$(CH_2)_{a1}$— with $1 \leq a1 \leq 15$, for example, $1 \leq a1 \leq 12$, for example, $1 \leq a1 \leq 3$.

The at least one alkylene oxide group of spacer X may be, for example, an ethylene oxide group and/or a propylene oxide group. In particular, the at least one alkylene oxide group may be an oligo-alkylene oxide group, for example, an oligo-ethylene oxide group and/or oligo-propylene oxide group. In particular, the alkylene oxide group or oligo-alkylene oxide group may have $\geq 1$ or $\geq 2$ to $\leq 10$ repetition units, for example, $\geq 1$ or $\geq 2$ to $\leq 4$ repetition units. For example, the at least one alkylene oxide unit may have the general chemical formula: —$[CH_2-CH_2-O-]_b$ with $1 \leq b \leq 10$, for example, $1 \leq$ or $2 \leq b \leq 4$.

The bonding of the at least one alkylene oxide group of spacer X to polymer backbone or oligomer backbone -[A]- and group Q may be carried out, for example, in each case via an, in particular saturated and/or unsaturated, linear or branched alkylene group, for example, methylene group, and/or alkoxy group. Spacer X may be, for example, an alkyl-alkylene oxide-alkyl group, for example, an alkyl-oligo-alkylene oxide-alkyl group, for example, of the general chemical formula:) —$(CH_2)_{a1}-[CH_2-CH_2-O-]_{b1}-(CH_2)_{a1'}$— with $1 \leq a1 \leq 12$, in particular $1 \leq a1 \leq 3$, $1 \leq b1 \leq 10$, in particular $1 \leq$ or $2 \leq b1 \leq 4$, and $1 \leq a1' \leq 12$, in particular $1 \leq a1' \leq 3$, or an alkoxy-alkylene oxide-alkyl group, for example, an alkoxy-oligo-alkylene oxide-alkyl group, for example, of the general chemical formula:) —$(CH_2)_{a2}$—O—$[CH_2-CH_2-O-]_{b2}-(CH_2)_{a2'}$— with $1 \leq a2 \leq 12$, in particular $1 \leq a2 \leq 3$, $1 \leq b2 \leq 10$, in particular $1 \leq$ or $2 \leq b2 \leq 4$, and $1 \leq a2' \leq 12$, in particular $1 \leq a2' \leq 3$.

The at least one phenylene oxide group and/or the at least one phenylene group and/or the at least one benzylene group of spacer X may be substituted in particular with one or multiple alkyl side chain(s) and/or one or multiple alkylene oxide side chain(s), for example, oligo-alkylene oxide side chain(s), for example, oligo-ethylene oxide side chain(s) and/or oligo-propylene oxide side chain(s), and/or one or multiple cyclic carbonate group(s) and/or lactone group(s) and/or cyclic carbamate group(s) and/or acyclic carbonate group(s) and/or acyclic carboxylic acid ester group(s) and/or acyclic carbamate group(s) and/or one or multiple charged group(s), for example, in particular quaternary, ammonium ion group(s) and/or pyridinium group(s) and/or imidazolium group(s) and/or piperidinium group(s) and/or pyrollidinium group(s) and/or, in particular quaternary, phosphonium group(s) and/or guanidinium group(s) and/or morpholinium group(s) and/or uronium group(s) and/or thiouronium group(s) and/or sulfonyl imide group(s) and/or sulfonate group(s), for example, lithium sulfonate groups. The ion conductivity may thus advantageously be increased further—in particular as explained in conjunction with corresponding groups Q, $Q^+$, and $Q^-$. For example, spacer X may include one or more phenylene oxide group(s) and/or phenylene group(s) and/or benzylene group(s). (In each case), an in particular saturated and/or unsaturated, linear or branched, for example, partially or completely halogenated or unhalogenated, for example, partially fluorinated or perfluorinated or unfluorinated alkylene group and/or alkylene oxide group, for example, oligo-alkylene oxide group, for example, oligo-ethylene oxide group and/or oligo-propylene oxide group, may be incorporated between phenylene oxide groups and/or phenylene groups and/or benzylene groups of spacer X.

The bonding of the at least one carbonyl group of spacer X to polymer backbone or oligomer backbone -[A]- and group Q may take place in each case, for example, via an in particular saturated and/or unsaturated, linear or branched, for example, partially or completely halogenated or unhalogenated, for example, partially fluorinated or perfluorinated or unfluorinated alkylene group and/or alkylene oxide group, for example, an oligo-alkylene oxide group, for example, an oligo-ethylene oxide group and/or oligo-propylene oxide group.

For example, spacer X may include one or several groups Q*, which are similar to Q. The bonding to polymer backbone or oligomer backbone -[A]- and in particular terminal group Q may take place (in each case), for example, via an in particular saturated and/or unsaturated, linear or branched, for example, partially or completely halogenated or unhalogenated, for example, partially fluorinated or perfluorinated or unfluorinated alkylene group and/or alkylene oxide group, for example, oligo-alkylene oxide group, for example, oligo-ethylene oxide group and/or oligo-propylene oxide group.

For example, spacer X may be an in particular saturated and/or unsaturated, linear or branched alkylene spacer. In the case of an alkylene spacer X, in particular in the saturated case, the number of the carbon atoms in the spacer may be in particular ≥1 to ≤12, for example, ≥1 to ≤4. For example, the alkylene spacer may be based on the general chemical formula: —$(CH_2)_{a1}$— with $1 \leq a1 \leq 12$, in particular $1 \leq a1 \leq 3$.

Or spacer X may be, for example, an alkylene oxide spacer, for example, an oligo-alkylene oxide spacer, for example, an oligo-ethylene oxide spacer or oligo-propylene oxide spacer. In the case of an embodiment as an oligo-alkylene oxide spacer, the number of the repetition units may be, for example, ≥2 to ≤10 repetition units, in particular ≥2 to ≤4. The bonding of the alkylene oxide unit, for example, oligo-alkylene oxide unit, for example, the oligo-ethylene oxide unit or oligo-propylene oxide unit, to polymer backbone or oligomer backbone -[A]- or group Q may take place in particular in each case via an, in particular saturated and/or unsaturated, linear or branched alkylene group, for example, methylene group. For example, the alkylene oxide spacer may be based on the general chemical formula: —$(CH_2)_{a3}$— [$CH_2$—$CH_2$—$O]_{b3}$—$(CH_2)_{a3}$— with $1 \leq b3 \leq 10$, in particular $1 \leq b3 \leq 4$, and 1 or $0 \leq a3 \leq 3$, for example, a3=1.

Or spacer X may be, for example, a spacer based on in particular substituted or unsubstituted phenylene oxide and/or phenylene and/or benzylene. In particular, the spacer may include multiple phenylene oxide units and/or phenylene units and/or benzylene units. (In each case), an in particular saturated and/or unsaturated, linear or branched, for example, partially or completely halogenated or unhalogenated, for example, partially fluorinated or perfluorinated or unfluorinated alkylene group and/or alkylene oxide group, for example, oligo-alkylene oxide group, for example, oligo-ethylene oxide group and/or oligo-propylene oxide group, may be incorporated between phenylene oxide units and/or oligo-phenylene oxide units and/or phenylene units and/or oligo-phenylene units and/or benzylene units and/or oligo-benzylene units of spacer X. A substitution may take place in particular with one or multiple alkyl side chain(s) and/or one or multiple alkylene oxide side chain(s), for example, oligo-alkylene oxide side chain(s), for example, oligo-ethylene oxide side chain(s) and/or oligo-propylene oxide side chain(s), and/or one or multiple cyclic carbonate group(s) and/or lactone group(s) and/or cyclic carbamate group(s) and/or acyclic carbonate group(s) and/or acyclic carboxylic acid ester group(s) and/or acyclic carbamate group(s) and/or one or multiple charged group(s), for example, quaternary ammonium group(s) and/or pyridinium group(s) and/or imidazolium group(s) and/or piperidinium group(s) and/or pyrollidinium group(s) and/or, in particular quaternary, phosphonium group(s) and/or guanidinium group(s) and/or morpholinium group(s) and/or uronium group(s) and/or thiouronium group(s) and/or sulfonyl imide group(s) and/or sulfonate group(s), for example, lithium sulfonyl imide group(s) and/or lithium sulfonate group(s).

Or spacer X may be, for example, a carbonyl spacer, for example, an alkylene/alkylene oxide carbonyl alkylene/alkylene oxide spacer.

Or spacer X may be, for example, an ether oxygen (—O—).

Within the scope of one special embodiment, spacer X is an alkylene and/or alkylene oxide spacer, for example, an alkylene and/or oligo-alkylene oxide spacer, for example, an ethylene oxide and/or oligo-ethylene oxide spacer.

-[A]- may stand in particular for a unit which forms a polymer backbone or oligomer backbone, which includes (at least) one alkylene oxide unit, in particular an ethylene oxide unit and/or propylene oxide unit, for example, an oligo-alkylene oxide unit, for example, an oligo-ethylene oxide unit and/or oligo-propylene oxide unit, and/or a unit including a carbonate group, in particular an organic carbonate group, and/or a siloxane unit and/or a phosphazene unit and/or a methyl methacrylate unit and/or a methacrylate unit and/or a phenylene unit, for example, a para-phenylene unit, and/or a phenylene oxide unit and/or a benzylene unit and/or an alkylene unit.

For example, -[A]- may stand for a unit which forms a polymer backbone, which includes and/or forms a polyether, in particular polyethylene oxide and/or polypropylene oxide and/or polymerized, in particular organic repetition units including carbonate group(s), for example, a structural unit, which forms a polycarbonate and/or a polymer made of polymer backbone, having side groups containing carbonate groups, and/or a polysiloxane and/or a polyphosphazene and/or a poly(methyl) methacrylate and/or a polymethacrylate and/or a polyphenylene, for example, a para-polyphenylene, and/or a polyphenylene oxide and/or a polybenzylene and/or a polyolefin, for example, polypropylene and/or polyethylene. For example, -[A]- may stand for a unit which forms a polymer backbone, which is based on a polyether, in particular polyethylene oxide and/or polypropylene oxide and/or polymerized, in particular organic repetition units including carbonate group(s), and/or a polysiloxane and/or a polyphosphazene and/or a poly(methyl) methacrylate and/or a polymethacrylate and/or a polyphenylene, for example, a para-polyphenylene, and/or a polyphenylene oxide and/or a polybenzylene and/or a polyolefin, for example, polypropylene and/or polyethylene.

The ion mobility and therefore the ion conductivity may advantageously be increased by an alkylene oxide unit, in particular an ethylene oxide unit and/or propylene oxide unit, for example, an oligo-alkylene oxide unit, for example, an oligo-ethylene oxide unit and/or oligo-propylene oxide unit, in particular an oligo-ethylene oxide unit. A low glass transition temperature of the polymer and therefore a high ion conductivity may be achieved by a siloxane and/or phosphazene unit. The synthesis may advantageously be simplified by a methyl methacrylate unit and/or methacrylate unit. Electrical conductivity may advantageously additionally be achieved and in addition one or multiple substitutions, for example, sulfonations, may be carried out easily by phenylene units, in particular para-phenylene units, or polyphenylene. In particular, multiple sulfonations of the phenylene unit and/or the polyphenyl or oligo-phenyl backbone formed therefrom are also possible.

Unit -[A]- which forms the polymer backbone or oligomer backbone may be monofunctionalized and also polyfunctionalized, for example, bifunctionalized, trifunctionalized, or tetrafunctionalized using group Q, which is bound via spacer X. A polyfunctionalized unit -[A]- which forms the polymer backbone or oligomer backbone may be understood in particular as a unit -[A]- which forms the polymer backbone or oligomer backbone, and which is functionalized using at least two groups Q, for example, $Q^-$ and/or Q and/or $Q^+$, in particular in each case one group Q, for example, $Q^-$ or Q or $Q^+$, optionally via a spacer X, in particular $X_X$, being bound to unit -[A]- which forms the polymer backbone or oligomer backbone.

For example, if Q stands for a negatively charged group $Q^-$—the polymer electrolyte and/or oligomer electrolyte formed from the monomers and/or oligomers and/or the at least one polymer electrolyte of the at least one solid electrolyte may include or be a sulfonate group, in particular lithium sulfonate group, substituted polyphenylene, for example, para-polyphenylene, for example, which includes at least one phenylene repetition unit, which is substituted at least once with a sulfonate group, in particular a lithium sulfonate group, for example, with multiple sulfonate groups, in particular lithium sulfonate groups. This has proven to be advantageous because the number of the anionic units and therefore lithium ion charge carriers for phenylene unit may thus be increased. In addition to the phenylene unit substituted with sulfonate groups, unit -[A]- which forms the polymer backbone or oligomer backbone for example, in the form of a polyphenylene, may also include one or multiple other phenylene units, for example, an unsubstituted phenylene unit and/or a phenylene unit substituted once or multiple times with in each case a group Q, for example, $Q^-$ or Q or $Q^+$, and a spacer X, in particular $X_X$.

For example—if Q stands for an uncharged group Q—the polymer electrolyte and/or oligomer electrolyte formed from the monomers and/or oligomers and/or the at least one polymer electrolyte of the at least one solid electrolyte may include or be an alkylene-oxide-functionalized, for example, ethylene-oxide-functionalized and/or polyethylene-glycol-functionalized polyacrylate or polymethacrylate, for example, a poly(ethylene glycol) methyl ether methacrylate (PEGMA).

Within the scope of one embodiment, in particular within the scope of which Q stands for a negatively charged group $Q^-$ and a counter ion $Z^+$, the ion-conducting liquid, which in particular contains monomers and/or oligomers, and/or the further liquid, for example, solely contains monomers and/or oligomers for forming a polymer electrolyte and/or oligomer electrolyte and/or an initiator, for example, a polymerization initiator and/or cross-linking initiator and/or linking initiator, and/or at least one in particular gel-forming and/or ion-conductive solvent, and/or monomers and/or oligomers for forming an in particular ion-conductive polymer, which has a lower glass transition temperature and/or a higher conducting salt solubility and/or coordination capability than the polymer electrolyte and/or oligomer electrolyte formed from the monomers and/or oligomers for forming a polymer electrolyte and/or oligomer electrolyte, for example, a single-ion-conducting polyelectrolyte and/or oligoelectrolyte, and/or conductive additive nanoparticles, and/or is free of in particular free or mobile conducting salts and/or liquid electrolytes.

Within the scope of an additional or alternative embodiment, in particular within the scope of which Q stands for a negatively charged group $Q^-$ and a counter ion $Z^+$, the at least one solid electrolyte contains, for example, solely polymer electrolyte, in particular single-ion-conducting polyelectrolyte and/or ion-conductive, in particular lithium-ion-conductive polymers, and/or inorganic, for example, ceramic and/or glass-like ion conductors and/or further, gel-forming and/or ion-conductive, in particular lithium-ion-conductive solvents and/or polymers, which have a lower glass transition temperature and/or a higher conducting salt solubility and/or coordination capability than the polymer electrolyte and/or oligomer electrolyte formed from the monomers and/or oligomers for forming a polymer electrolyte and/or oligomer electrolyte, for example, a single-ion-conducting polyelectrolyte and/or oligoelectrolyte, and/or conductive additive nanoparticles, and/or is free of in particular free or mobile conducting salts and/or liquid electrolytes.

A high transference number, in particular which may be close to 1, may advantageously be achieved by an embodiment free of conducting salt and/or liquid electrolyte. If the ion-conducting liquid includes monomers and/or oligomers for forming a single-ion-conducting polyelectrolyte and/or oligoelectrolyte and/or the at least one solid electrolyte includes at least one single-ion-conducting polyelectrolyte, the transference number may decrease due to the addition of in particular free or mobile conducting salts and/or liquid electrolytes. Nonetheless, the addition of small quantities of conducting salt, in particular in spite of a reduction of the transference number, may also have a positive influence on the overall transport properties of the electrolyte inside the pores of the porous active material particles or between the porous active material particles, for example, upon a joint consideration of the transference number and the ionic conductivity and/or the ion concentration, also in the case of single-ion-conducting polyelectrolytes and/or oligoelectrolytes.

Within the scope of another embodiment, in particular within the scope of which Q stands for an uncharged group Q or for a positively charged group $Q^+$ and a counter ion $Z^-$, the ion-conducting liquid, which contains monomers and/or oligomers in particular, and/or the further liquid contains at least one conducting salt, in particular lithium conducting salt, and/or at least one, in particular gel-forming and/or ion-conductive solvent and/or at least one liquid electrolyte, in particular made of at least one ion-conductive and/or gel-forming solvent and at least one conducting salt, in particular lithium conducting salt, and/or conductive additive nanoparticles.

Within the scope of an additional or alternative embodiment, in particular within the scope of which Q stands for an uncharged group Q or for a positively charged group $Q^+$ and a counter ion $Z^-$, the at least one solid electrolyte contains at least one conducting salt, in particular a lithium conducting salt, and/or at least one, in particular gel-forming and/or ion-conductive solvent and/or at least one liquid electrolyte, in particular made of at least one ion-conductive and/or gel-forming solvent and at least one conducting salt, in particular a lithium conducting salt, and/or at least one conductive additive.

Within the scope of one embodiment of the above specific embodiments, the ion-conductive liquid, which in particular contains monomers and/or oligomers, and/or the further liquid and/or the at least one solid electrolyte contains at least one conducting salt, for example, an alkali metal conducting salt, for example, a lithium conducting salt and/or sodium conducting salt, in particular a lithium conducting salt.

For example, the at least one lithium conducting salt, in particular of the ion-conducting liquid and/or the further liquid and/or the at least one solid electrolyte, may include or be lithium bis(trifluoromethane sulfonyl) imide (LiTFSI) and/or lithium hexafluorophosphate (LiPF$_6$) and/or lithium bisoxalatoborate (LiBOB) and/or trifluoromethane sulfonate (LiTriflate) and/or lithium perchlorate (LiClO$_4$) and/or lithium difluorooxalatoborate (LiDFOB) and/or lithium tetrafluoroborateborate (LiBF$_4$) and/or lithium bromide (LiBr) and/or lithium iodide (LiI) and/or lithium chloride (LiCl). Anion Z$^-$ and the anion of the at least one lithium conducting salt may be different or identical.

In the case of electrolytes which are based on ion-conductive, for example, lithium-ion-conductive materials, for example, ion-conductive polymers, for example, polyethylene oxide, and/or ion-conductive solvents, for example, organic carbonates, the at least one conducting salt may thus be introduced into the ion-conductive material, in particular dissolved therein, and in this way an electrolyte having ion-conducting, for example, lithium-ion-conducting properties may be provided.

In the case of single-ion-conducting polyelectrolytes and/or oligoelectrolytes and/or liquid electrolytes, the ion conductivity, in particular lithium-ion conductivity, may thus optionally be increased further. A small admixture of a conducting salt, in particular a lithium conducting salt, may possibly also be advantageous in the case of single-ion-conducting polyelectrolytes and/or oligoelectrolytes having a high transference number—although this may be at the cost of a reduction of the transference number—for example, to reduce the glass transition point of the polymer and thus increase the overall mobility of the lithium ions in the system. For example, in this case a conducting salt, in particular a lithium conducting salt, may be used, the anion of which interacts well with negatively charged group Q$^-$ of the single-ion-conducting polyelectrolyte and/or oligoelectrolyte. For example, lithium bis(trifluoromethane sulfonyl) imide (LiTFSI) may be used in the case of a sulfonyl imide group.

Within the scope of one special embodiment, the anion of the at least one conducting salt, in particular lithium conducting salt, and Z$^-$ and/or Q$^-$ are selected from the same anion class, for example, sulfonyl imides, for example, trifluoromethane sulfonyl imide and/or pentafluoroethane sulfonyl imide and/or fluorosulfonyl imide, in particular trifluoromethane sulfonyl imide. Undesirable side reactions may thus advantageously be avoided and in addition, the anion of the at least one conducting salt and Z$^-$ and/or Q$^-$ coordinates alkali ions, in particular lithium ions, similarly, for example, equally strongly, which may have an advantageous effect on the ion mobility.

Within the scope of another specific embodiment, the solid electrode, in particular in method step b), is formed with the aid of a dry coating process. In the dry coating process, for example, the impregnated active material and at least one solid electrolyte, for example, a catholyte or anolyte, and optionally at least one conductive additive may be mixed and a substrate, for example, a current collector, for example, made of aluminum or copper, may be coated using the resulting coating material. The coating may be carried out, for example, by dry application with a doctor knife. Dissolving of the electrolyte accommodated in the pores out of the pores of the porous active material particles by solvent may advantageously be avoided by an in particular solvent-free dry coating process. After the coating, the coating may furthermore be calendered. A minimized residual porosity of the solid electrode, for example, of ≤5%, for example, of ≤2% may thus advantageously be achieved. Since a drying process may be omitted in the case of a dry coating process, in particular liquid electrolyte and/or solvent may remain in the pores of the porous active material particles in this case.

Within the scope of another specific embodiment, the solid electrode, in particular in method step b), is formed with the aid of a wet coating process, for example, with the aid of a casting process. In the wet coating process, for example, the impregnated active material particles and at least one solid electrolyte, for example, a catholyte or anolyte, and optionally at least one conductive additive may be mixed with at least one coating solvent, for example, dissolved and/or dispersed therein, and a substrate, for example, a current collector, for example, made of aluminum or copper, may be coated using the resulting coating material, the at least one coating solvent being removed again after the coating, for example, by a drying process. The coating may be carried out, for example, by wet application with a doctor knife. For example, the wet coating process may be a classic slurry process. The at least one coating solvent may be selected in particular in such a way that it has a low solubility with respect to the electrolyte accommodated in the pores of the porous active material. Dissolving of the electrolyte accommodated in the pores out of the pores of the porous active material particles may thus advantageously be further suppressed. After the coating and in particular after the removal of the at least one coating solvent, the coating may furthermore be calendered. A minimized residual porosity of the solid electrode, for example, of ≤5%, for example, of ≤2% may thus advantageously be achieved.

Within the scope of another specific embodiment, the method is configured for manufacturing a solid electrode and/or the porous active material particles are cathode active material particles. For example, the porous active material particles or cathode active material particles may include a lithium conversion material, i.e., a material which may undergo a conversion reaction with lithium, for example, based on sulfur, or a lithium intercalation material, i.e., a material which may intercalate lithium, for example, based on metal oxide, or may be formed therefrom.

In particular a lithium metal anode may be used as the anode. A particularly high specific energy density may thus advantageously be achieved. However, it is also possible to use a solid anode according to the present invention, which will be explained hereafter. By combining a solid cathode, in particular having cathode active material particles and catholyte, and a solid anode, in particular having anode active material particles and anolyte, a particularly high rate capability may advantageously be achieved.

Within the scope of one special specific embodiment, the porous active material particles or the cathode active material particles include a sulfur-carbon composite, in particular a sulfur-polymer and/or carbon modification composite, or are formed therefrom. For example, the porous active material particles or the cathode active material particles may include a sulfur-polymer composite, for example, a composite made of an in particular electrically conductive polymer with covalently and/or ionically, in particular covalently bound sulfur, or may be formed therefrom. Sulfur-carbon composites may have a high porosity, because of which the method may be particularly advantageously used for this purpose.

Within the scope of one embodiment of this specific embodiment, the porous active material particles or the cathode active material particles include a sulfur-polyacrylonitrile composite or are formed therefrom. In particular, the porous active material particles or the cathode active material particles may include SPAN or may be formed therefrom. Sulfur-polyacrylonitrile composites, such as SPAN, may have a high porosity, because of which the method may be particularly advantageously used for this purpose.

SPAN may be understood in particular as a composite or polymer based on polyacrylonitrile (PAN), in particular cyclized polyacrylonitrile (cPAN) having in particular covalently bound sulfur, in particular which is obtainable by a thermal conversion and/or chemical reaction of polyacrylonitrile in the presence of sulfur.

In particular, nitrile groups may react to form a polymer, in particular having conjugated n-system, in which the nitrile groups are converted into nitrogen-containing rings, in particular six-member rings, which are attached to one another, in particular using covalently bound sulfur. For example, SPAN may be manufactured by heating polyacrylonitrile (PAN) with an excess of elementary sulfur, in particular to a temperature of ≥300° C., for example, approximately ≥300° C. to ≤600° C. The sulfur may in particular, on the one hand, cyclize the polyacrylonitrile (PAN) while forming hydrogen sulfide ($H_2S$) and, on the other hand—for example with formation of a covalent S—C bond—may be bound in finely dispersed form in the cyclized matrix, for example, a cyclized polyacrylonitrile structure having covalent sulfur chains being formed. SPAN is described in Chem. Mater., 2011, 23, 5024 and J. Mater. Chem., 2012, 22, 23240, J. Elektrochem. Soc., 2013, 160 (8) A1170, and in publication WO 2013/182360 A1.

Within the scope of another specific embodiment, the method is configured for manufacturing a solid anode and/or the porous active material particles are anode active material particles. For example, the porous active material particles or the anode active material particles may include a lithium intercalation material, for example, graphite and/or amorphous carbon, and/or a lithium alloy material, for example, silicon and/or tin, or may be formed therefrom.

In particular, the method may also be configured for manufacturing an all-solid-state cell. For example, the electrode, which is formed in method step b) in particular, for example, a solid cathode may be assembled, for example, in a method step c), with a separator and a further, in particular solid electrode, for example, a lithium metal anode or a solid anode, for example, manufactured by a similar method according to the present invention, to form an all-solid-state cell. The separator may include at least one (further) solid electrolyte or may be formed therefrom. The all-solid-state cell may be configured, for example, in the form of a cell stack.

The polymer electrolyte and/or oligomer electrolyte formed from the monomers and/or oligomers, the at least one solid electrolyte of the solid electrode, in particular the catholyte and/or anolyte, and the at least one (further) solid electrolyte of the separator do not necessarily have to be identical in principle, but rather, for example, may differ from one another and/or may be adapted and in particular optimized to the particular requirements for example, with respect to the solution behavior, the voltage stability, the volume work, the pore size, etc. in the particular field of use of the cell. However, it may be advantageous if the polymer electrolyte and/or oligomer electrolyte formed from the monomers and/or oligomers, the at least one solid electrolyte of the solid electrode, in particular the catholyte and the anolyte, and the at least one (further) solid electrolyte of the separator are at least similar or possibly even identical.

Reference is hereby explicitly made to the explanations in conjunction with the solid electrode according to the present invention, the all-solid-state cell according to the present invention, and to the figures and the description of the figures with respect to further technical features and advantages of the method according to the present invention.

In addition, the present invention relates to a solid electrode, in particular a solid cathode and/or a solid anode, which is manufactured by a method according to the present invention.

Moreover, the present invention relates to a solid electrode, in particular a solid cathode and/or a solid anode, which includes porous active material particles, in relation to the total pore volume of the open pores of the porous active material, ≥50 vol. %, for example, ≥60 vol. % or ≥70 vol. % or ≥80 vol. % or ≥90 vol. % or ≥95 vol. % of the open pores of the porous active material particles being filled with at least one electrolyte, for example, a polymer electrolyte and/or oligomer electrolyte and/or liquid electrolyte, for example, a single-ion-conducting polyelectrolyte and/or oligoelectrolyte, the electrolyte-filled, porous active material particles being embedded in at least one solid electrolyte. Such a solid electrode, in particular in which the open pores of the porous active material particles are essentially completely filled with at least one electrolyte, may be manufactured using the method according to the present invention, for example, and/or configured as explained in conjunction with the method according to the present invention.

Within the scope of one specific embodiment, the solid electrode furthermore includes at least one conductive additive. The at least one conductive additive may also be embedded in the at least one solid electrolyte.

Within the scope of one special specific embodiment, the solid electrode is a solid cathode. The porous active material particles may include in particular a sulfur-carbon composite, for example, a sulfur-polymer and/or carbon modification composite, for example, a sulfur-polyacrylonitrile composite, such as SPAN, or may be formed therefrom.

A manufacture or solid electrode according to the present invention is apparent, for example, in electrode joints by the extent of the filling of the pores of the porous active material and/or is detectable by comparing the mean density of the electrode to the mean density of a composition made of the individual components of the electrode.

Reference is hereby explicitly made to the explanations in conjunction with the method according to the present invention, the all-solid-state cell according to the present invention, and to the figures and the description of the figures with respect to further technical features and advantages of the solid electrodes according to the present invention.

Furthermore, the present invention relates to an all-solid-state cell, which includes a cathode, a separator, and an anode. For example, the all-solid-state cell may be an all-solid-state alkali metal-sulfur cell, for example, an all-solid-state lithium-sulfur cell and/or an all-solid-state sodium-sulfur cell, in particular an all-solid-state lithium-sulfur cell.

The cathode may be in particular a solid cathode according to the present invention. The anode may be a lithium metal anode or a solid anode according to the present invention. In particular, the all-solid-state cell may include a solid cathode according to the present invention and a lithium metal anode.

The separator may, for example, also—in particular in addition to the function of the electronic insulation of cathode and anode—be used as a protective layer, in particular for the anode, in particular for a lithium metal anode.

Dendrite growth from the anode to the cathode and internal short-circuits which accompany this may thus advantageously be avoided over the intended cycle service life.

Within the scope of one specific embodiment, the separator includes a block copolymer, for example, a polyethylene oxide-polystyrene block copolymer (PEO-b-PS), and/or a single-ion-conducting polyelectrolyte and/or an inorganic, for example, ceramic ion conductor. For example, the separator may include a block copolymer layer, for example, made of a polyethylene-polystyrene block copolymer (PEO-b-PS), and/or a layer containing a single-ion-conducting polymer electrolyte, and/or a layer containing an inorganic, for example, ceramic ion conductor. This has proven to be particularly advantageous for assuming a function as a protective layer against dendrite growth.

All-solid-state cells according to the present invention may be used in particular in battery systems. The all-solid-state cells may advantageously even permit electrode charges of in particular up to 3 mAh/cm$^2$ and therefore, in particular in combination with, for example, metallic lithium anodes, very high energy densities with high constant current loads at the same time, of up to 3 C or higher, in particular at an elevated temperature, in particular of $\geq 50°$ C., for example, $\geq 70°$ C., for example, $\geq 80°$ C., in the charging and discharging directions. The all-solid-state cells are therefore advantageously also suitable for vehicle battery systems, for example, for electric vehicles and hybrid electric vehicles.

Reference is hereby explicitly made to the explanations in conjunction with the method according to the present invention, the solid electrode according to the present invention, and to the figures and the description of the figures with respect to further technical features and advantages of the cell according to the present invention.

Further advantages and advantageous embodiments of the subjects according to the present invention are illustrated by the drawings and explained in the following descriptions. It is to be noted that the drawings only have descriptive character and are not intended to restrict the present invention in any form.

DETAILED DESCRIPTION

Figure 1:
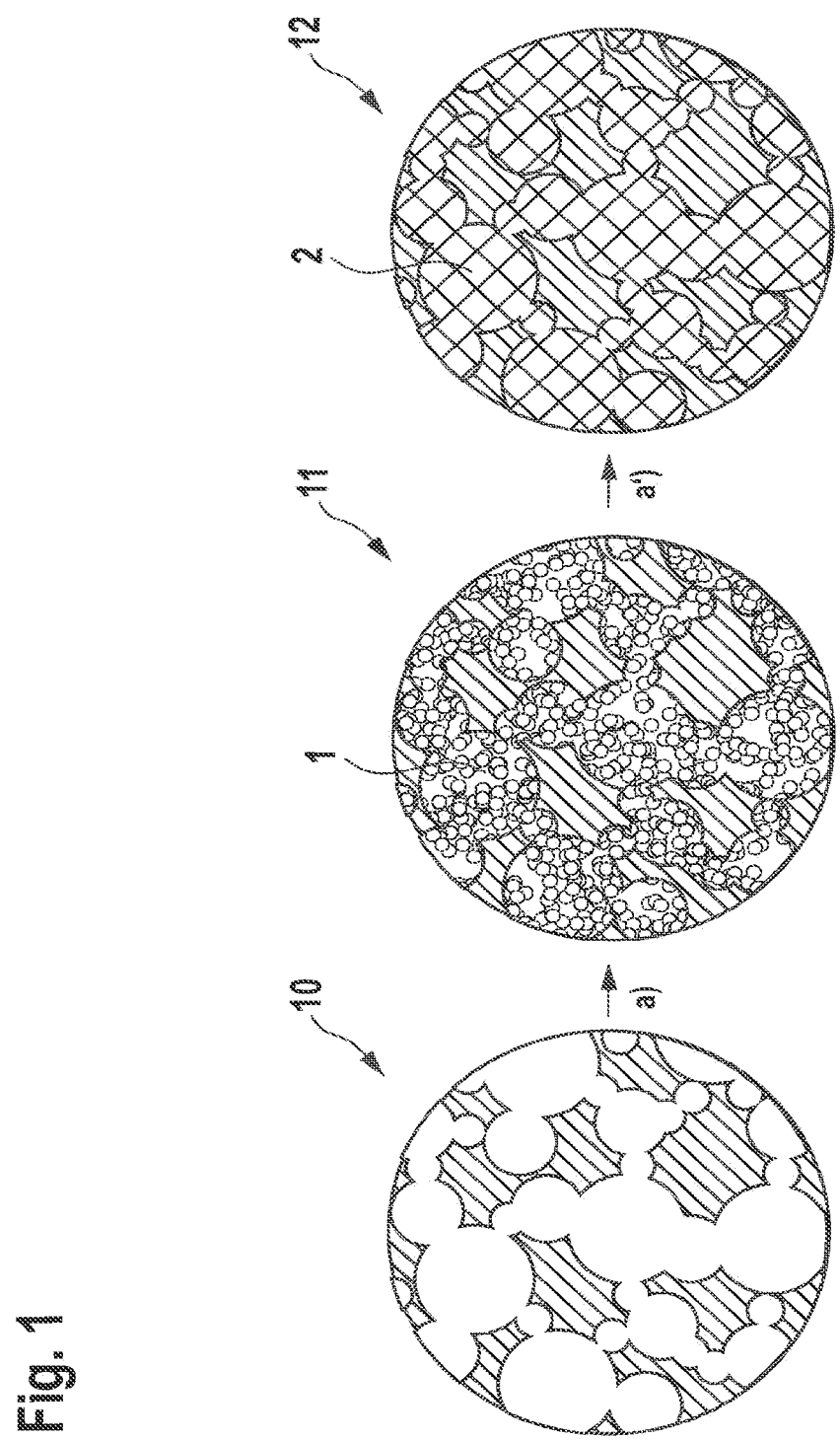
FIG. 1 shows schematic cross sections to illustrate one specific embodiment of the manufacturing method according to the present invention.

FIG. 1 illustrates that in the specific embodiment shown therein, in a method step a), porous active material particles 10 are impregnated using an ion-conducting, in particular lithium-ion-conducting liquid. An ion-conducting, in particular lithium-ion-conducting liquid, which contains monomers and/or oligomers, and which contains monomers 1 and/or oligomers for forming a polymer electrolyte 2 and/or oligomer electrolyte, and/or a liquid electrolyte, may be used as the ion-conducting liquid, as illustrated in FIG. 1. Monomers 1 and/or oligomers for forming a polymer electrolyte 2 and/or oligomer electrolyte may be configured in particular to form a single-ion-conducting polyelectrolyte 2 and/or oligomer electrolyte and/or to form an ion-conductive, in particular lithium-ion-conductive polymer.

Figure 3:
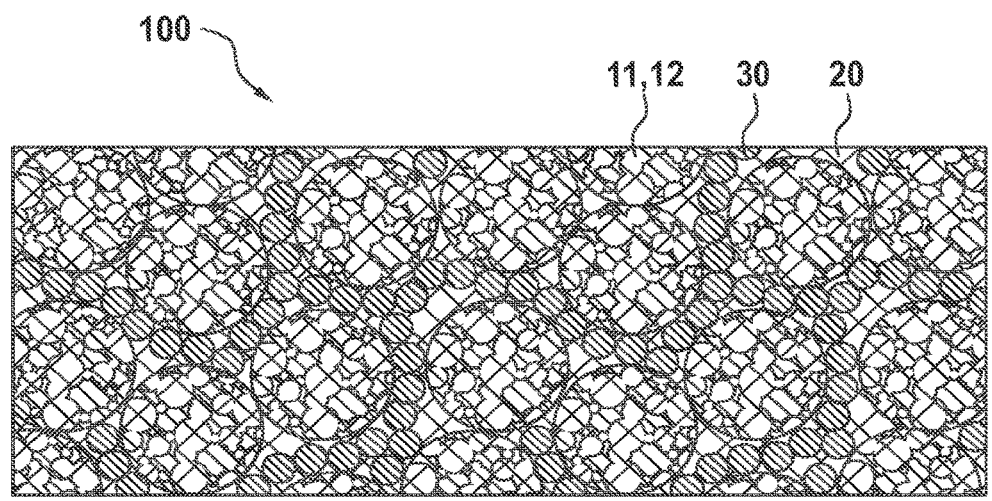
FIG. 3 shows a schematic cross section to illustrate one specific embodiment of a solid electrode according to the present invention.

Porous active material particles 10, which are to be impregnated with electrolyte, may be added, for example, in method step a) to the ion-conducting liquid, the ion-conducting liquid being absorbed in the pores of porous active material particles 10 and porous active material particles 10 being impregnated in this way. FIG. 1 illustrates that the open pores of porous active material particles 11, 12, in relation to the total pore volume of the open pores of porous active material particles 11, 12, are filled to $\geq 50$ vol. %, in particular essentially completely, with the ion-conducting liquid, which in particular contains monomers 1 and/or oligomers, and thus with an electrolyte, for example, a single-ion-conducting polyelectrolyte and/or oligoelectrolyte. Finally, for example, in a method step b) (not shown in the figures), a solid electrode 100, which is shown in FIG. 3, may be formed from such impregnated active material particles 11, 12 by adding at least one solid electrolyte 20.

Monomers 1 and/or oligomers may be dissolved in the liquid containing monomers and/or oligomers, for example, jointly with a polymerization initiator and/or cross-linking initiator and/or linking initiator in at least one solvent. In particular, if monomers 1 and/or oligomers do not have any lithium conducting salt functionalization themselves, in particular at least one conducting salt, for example, lithium conducting salt, may additionally be dissolved in the ion-conducting liquid. If oligomers are used, these may in particular have a size adapted to the pore size of porous active material particles 10 and/or a molecular weight adapted thereto. If the oligomers themselves do not have a lithium conducting salt functionalization, they may be used, for example, in the form of an oligomer/salt mixture.

FIG. 1 illustrates that within the scope of one embodiment, monomers 1 and/or oligomers are polymerized and/or cross-linked in a method step a'). FIG. 1 illustrates that polymer electrolyte 2 and/or oligomer electrolyte, which is formed from monomers 1 and/or oligomers, may advantageously extend from the opening surfaces of the outermost pores of porous active material particles 10, 11, 12 down into pores located deep inside and through porous active material particles 10, 11, 12.

Figure 2:
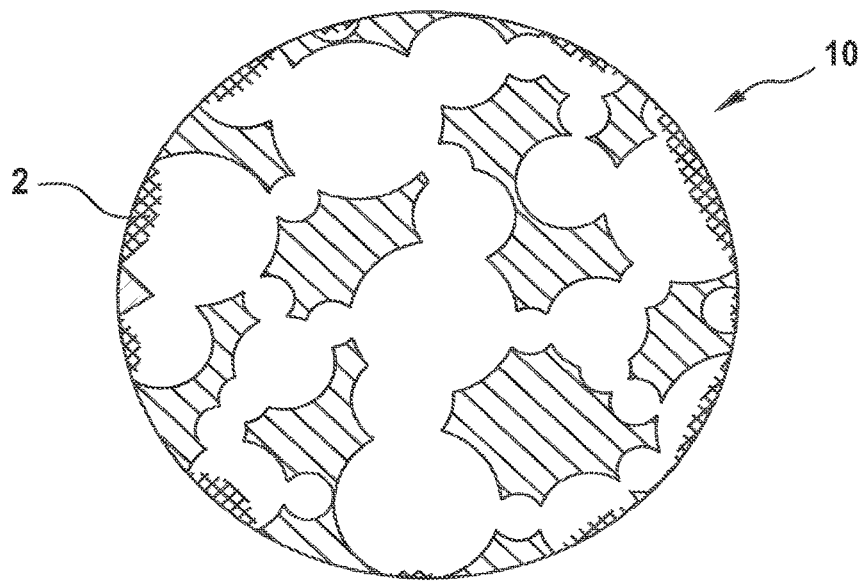
FIG. 2 shows a schematic cross section to illustrate the filling degree of a porous active material particle processed with the aid of a conventional method.

FIG. 2 illustrates that in a conventional manufacturing method, in which porous active material particles 10 are applied together with a polymer electrolyte 2, for example, in a paste process using a solvent-based paste, which includes porous active material particles 10 and polymer electrolyte 2, or in a solvent-free dry mixture process, polymer electrolyte 2 may only fill a very small volume proportion of the total pore volume of the open pores of porous active material particles 10. This may be due to the fact that the coil size of polymer electrolyte 2 exceeds the pore size of the open pores of porous active material particles 10, so that polymer electrolyte 2 may only be introduced partially into the outermost open pores. In the case of a paste process, free pore volume may additionally be created upon removal of the solvent. In the case of a dry mixture process, this may additionally be caused by an excessively high viscosity of polymer electrolyte 2. As a result of the mechanical properties, in particular the high viscosity, of pure polymer electrolytes 2, polymer electrolyte 2 may also only be pressed to a slight depth in the direction of the interior of particles 10 by subsequent calendering and compacting of the electrodes, even at temperatures above the softening temperature, and—as illustrated in FIG. 2—only open, broad pores on the surface of particles 10 are closed.

FIG. 3 shows that solid electrode 100—within the scope of the specific embodiment shown therein—includes impregnated active material particles 11, 12, which are manufactured as explained in conjunction with FIG. 1, and a solid electrolyte 20 and a conductive additive 30.

What is claimed is:

1. A method for manufacturing a solid electrode, the method comprising:
   impregnating porous active material particles using an ion-conducting liquid by adding to the ion-conducting liquid a plurality of the porous active material particles that are detached from one another in the form of individually separate particles; and
   forming the solid electrode from the impregnated active material particles by adding at least one solid electrolyte.

2. The method of claim 1, wherein the ion-conducting liquid includes at least one of: (i) an ion-conducting liquid containing at least one of monomers and oligomers for forming at least one of a polymer electrolyte and an oligomer electrolyte, and (ii) a liquid electrolyte.

3. The method of claim 2, wherein the at least one of the monomers and the oligomers are at least one of polymerized and cross-linked to form at least one of a polymer electrolyte and a oligomer electrolyte.

4. The method of claim 2, wherein at least one of (i) the at least one of the monomers and the oligomers, and (ii) the at least one of the polymer electrolyte and the oligomer electrolyte formed therefrom are linked chemically to functional groups on the surface of the porous active material particles.

5. The method of claim 1, wherein the ion-conducting liquid, which contains monomers and/or oligomers, furthermore contains a polymerization initiator and/or a cross-linking initiator and/or a linking initiator and/or the polymerization and/or cross-linking and/or linking reaction is started thermally and/or in a radiation-induced way or a UV-induced way.

6. The method of claim 1, wherein the impregnated active material particles are treated with a further liquid, which contains at least one gel-forming and/or ion-conductive solvent and/or at least one liquid electrolyte, before the formation of the solid electrode.

7. The method of claim 2, wherein the at least one of the monomers and oligomers for forming the at least one of the polymer electrolyte and the oligomer electrolyte are configured to form at least one of a single-ion-conducting polyelectrolyte and a oligoelectrolyte and/or to form at least one of an ion-conductive polymer and an ion-conductive oligomer.

8. The method of claim 2, wherein the ion-conducting liquid, which contains monomers and/or oligomers, furthermore includes monomers and/or oligomers for forming an ion-conductive polymer, which has a lower glass transition temperature and/or a higher conducting salt solubility and/or coordination capability than the polymer electrolyte and/or oligomer electrolyte formed from the monomers and/or oligomers for forming a polymer electrolyte and/or oligomer electrolyte.

9. The method of claim 1, wherein the ion-conducting liquid, which contains monomers and/or oligomers, furthermore contains conductive additive nanoparticles, including carbon nanoparticles.

10. The method of claim 1, wherein the at least one solid electrolyte includes at least one polymer electrolyte and/or at least one inorganic, including a ceramic and/or glass-like ion conductor corresponding to a lithium argyrodite and/or a sulfidic glass.

11. The method of claim 2, wherein the monomers and/or oligomers for forming a polymer electrolyte and/or oligomer electrolyte and/or the at least one solid electrolyte, the at least one polymer electrolyte of the at least one solid electrolyte, include at least one unit of the general chemical formula:

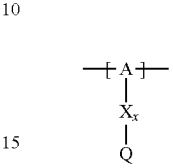

or are designed for the formation thereof, -[A]- standing for a unit which forms a polymer backbone or oligomer backbone, X standing for a spacer, x standing for the number of the spacer X and being 1 or 0, and Q standing for:
   a negatively charged group $Q^-$ and a counter ion $Z^+$;
   an uncharged group Q; or
   a positively charged group $Q^+$ and a counter ion $Z^-$.

12. The method of claim 1, wherein one of the following is satisfied:
   (i) the solid electrode is formed with a dry coating process, in which the impregnated active material particles and at least one solid electrolyte and optionally at least one conductive additive are mixed and a substrate corresponding to a current collector is coated using the resulting coating material, and
   (ii) the solid electrode is formed with a wet coating process, in which the impregnated active material particles and at least one solid electrolyte and optionally at least one conducting salt are mixed with at least one coating solvent and a substrate corresponding to a current collector, is coated using the resulting coating material, the at least one coating solvent being removed again after the coating by a drying process.

13. The method of claim 1, wherein the solid electrode is a solid cathode, in which the porous active material particles are cathode active material particles, or the solid electrode is a solid anode, in which the porous active material particles are anode active material particles.

14. The method of claim 13, wherein the porous active material particles or cathode active material particles include a sulfur-carbon composite corresponding to a sulfur-polymer and/or carbon modification composite corresponding to a sulfur-polyacrylonitrile composite, or are formed therefrom.

15. The method of claim 1, wherein the solid electrode is a solid cathode.

16. The method of claim 1, wherein, by the impregnation, ≥50 vol. % of open pores of the porous active material particles, with respect to a total pore volume of the open pores of the porous active material particles, are filled with the ion-conducting liquid, and the ion-conducting liquid includes at least one electrolyte; and
   the adding of the at least one solid electrolyte includes embedding the porous active material particles in the at least one solid electrolyte.

17. The method of claim 16, wherein at least one conductive additive is embedded in the at least one solid electrolyte.

18. The method of claim 16, wherein the solid electrode is a solid cathode, and the porous active material particles include or formed of a sulfur-carbon composite.

19. The method of claim 1, wherein the solid electrode includes an all-solid-state cell.

20. The method of claim 1, wherein the ion-conducting liquid includes a lithium-ion-conducting liquid.

21. The method of claim 2, wherein at least one of (i) the at least one of the monomers and the oligomers, and (ii) the at least one of the polymer electrolyte and the oligomer electrolyte formed therefrom are linked covalently to functional groups on the surface of the porous active material particles.

22. The method of claim 1, wherein the solid electrode is an anode.

23. A method for manufacturing an all-solid-state alkali metal sulfur cell, the method comprising:
for each of two electrodes, forming the respective electrode by:
impregnating porous active material particles using an ion-conducting liquid by adding to the ion-conducting liquid a plurality of the porous active material particles that are detached from one another in the form of individually separate particles; and
forming the respective electrode from the impregnated active material particles by adding at least one solid electrolyte; and
arranging a separator between the two electrodes, wherein one of the two electrodes is a solid cathode and the other of the two electrodes is a solid anode.

24. The method of claim 23, wherein the separator includes a block copolymer corresponding to a polyethylene oxide-polystyrene block copolymer, and/or a single-ion-conducting polyelectrolyte and/or an inorganic ion conductor.

25. The method of claim 1, wherein:
an interior of each particle of the active material includes a network of pores in mechanical communication with one another, and
during the impregnating, the ion-conducting liquid enters into the interior of each particle and fills the network of pores.

26. The method of claim 23, wherein:
an interior of each particle of the active material includes a network of pores in mechanical communication with one another, and
during the impregnating, the ion-conducting liquid enters into the interior of each particle and fills the network of pores.

* * * * *